US012649528B2

(12) United States Patent (10) Patent No.: US 12,649,528 B2
Byun et al. (45) Date of Patent: Jun. 9, 2026

(54) VEHICLE AIR SKIRT APPARATUS

(71) Applicant: HYUNDAI MOBIS CO., LTD., Seoul (KR)

(72) Inventors: Jae Sup Byun, Yongin-si (KR); Jang Ho Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 312 days.

(21) Appl. No.: 18/421,430

(22) Filed: Jan. 24, 2024

(65) Prior Publication Data

US 2025/0065963 A1 Feb. 27, 2025

(30) Foreign Application Priority Data

Aug. 23, 2023 (KR) ......................... 10-2023-0110574

(51) Int. Cl.
B62D 35/00 (2006.01)
(52) U.S. Cl.
CPC ................................... B62D 35/005 (2013.01)
(58) Field of Classification Search
CPC .... B60R 19/48; B62D 35/001; B62D 35/002; B62D 35/02; B62D 37/02
USPC ........................................... 296/180.1, 180.2
See application file for complete search history.

(56) References Cited

U.S. PATENT DOCUMENTS

| | | | | |
|---|---|---|---|---|
| 11,161,557 B2 * | 11/2021 | Urbach | ............... | B62D 35/005 |
| 11,472,494 B2 * | 10/2022 | Gillin | ................. | B62D 25/2054 |
| 12,103,602 B2 * | 10/2024 | Rogner | ................ | B62D 35/007 |
| 2015/0084369 A1 * | 3/2015 | Niemi | .................... | B62D 35/02 |
| | | | | 296/180.1 |
| 2019/0084630 A1 | 3/2019 | Potvin et al. | | |

FOREIGN PATENT DOCUMENTS

| | | |
|---|---|---|
| KR | 10-2017-0067565 A | 6/2017 |
| KR | 10-2020-0001850 A | 1/2020 |

OTHER PUBLICATIONS

English translation of KR 10-2020-0001850; retrieved via KIPRIS located at https://www.kipris.or.kr/khome/main.do. (Year: 2026).*
Extended European search report issued on Sep. 6, 2024, in counterpart European Patent Application No. 24153414.8 (7 pages).

* cited by examiner

*Primary Examiner* — Jason S Daniels
(74) *Attorney, Agent, or Firm* — NSIP Law

(57) ABSTRACT

A vehicle air skirt apparatus includes a housing having an outlet hole, a skirt including a first skirt and a second skirt which are movably disposed in the housing to protrude outward from the housing through the outlet hole, and a guide which is disposed in the housing. The guide guides the first skirt and the second skirt such that, when any one of the first skirt and the second skirt is completely withdrawn into the housing, the other one of the first skirt and the second skirt is additionally withdrawn into the housing.

13 Claims, 24 Drawing Sheets

VEHICLE AIR SKIRT APPARATUS

CROSS-REFERENCE TO RELATED APPLICATION(S)

This application claims the benefit of priority to Korean Patent Application No. 10-2023-0110574, filed in the Korean Intellectual Property Office on Aug. 23, 2023, the entire contents of which are incorporated herein by reference for all purposes.

BACKGROUND

1. Field

The present invention relates to a vehicle air skirt apparatus, and more particularly to a vehicle air skirt apparatus for preventing damage to a vehicle skirt.

2. Description of Related Art

When a vehicle travels, a vehicle body collides with a headwind which is air in an atmosphere, and thus an air resistance force is applied to the vehicle, and in this case, the resistance force of the headwind causes a decrease in fuel efficiency. Accordingly, a structure for improving aerodynamic performance and increasing fuel efficiency by reducing the resistance force of the headwind is required in the vehicle.

One example of an apparatus for improving aerodynamic performance includes an active air skirt apparatus which actively operates in conjunction with a speed of the vehicle. In a state in which the active air skirt apparatus is disposed in a front bumper, when the vehicle travels at a high speed, the active air skirt apparatus is an apparatus that reduces an amount of air flowing to an underbody through the front bumper to improve the aerodynamic performance. The active air skirt apparatus may include a skirt protruding outward from the vehicle.

However, in the conventional active air skirt apparatus, since the skirt is formed of a material having high rigidity so as not to be pushed back by the headwind, when the skirt comes into contact with foreign matter, such as a stone present on a road surface, or a speed bump while the vehicle travels, there is a problem that the skirt is damaged.

In addition, in order to prevent collision between the skirt and foreign matter such as a stone present on the road surface or a speed bump, the conventional active air skirt apparatus uses a power generation speed of an actuator, and thus an over operation of the actuator occurs, causing a problem of damage to the actuator.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present invention is directed to providing a vehicle air skirt apparatus improved to prevent a skirt from being damaged by a speed bump or foreign matter such as a stone present on a road surface while a vehicle travels.

The present invention is also directed to providing a vehicle air skirt apparatus improved to prevent an actuator from over operating to quickly retract a skirt.

In a general aspect of the disclosure, a vehicle air skirt apparatus includes: a housing having an outlet hole; a skirt including a first skirt and a second skirt which are movably disposed in the housing to protrude outward from the housing through the outlet hole; and a guide which is disposed in the housing, wherein the guide is configured to guide the first skirt and the second skirt such that, when any one of the first skirt and the second skirt is completely withdrawn into the housing, the other one of the first skirt and the second skirt is additionally withdrawn into the housing.

The guide may include: a first guide plate which is fixedly installed in the housing and on which first guide ribs are formed; a moving plate which is movably disposed between the first guide ribs and moves the first skirt and the second skirt; and a link assembly which connects the housing and the moving plate and moves the moving plate.

The moving plate may include: a first moving plate connected to the first skirt to move the first skirt; and a second moving plate connected to the second skirt to move the second skirt.

The first guide rib of the first guide plate may include: a first rib which forms a moving space of the moving plate and guides a moving direction of the moving plate; and a second rib which forms a step with the first rib and stops movement of the first moving plate.

The guide may include a second guide plate which is disposed between the first guide plate and the first moving plate and guides a moving direction of the second moving plate.

The second guide plate may include: a third rib which forms a moving space of the second moving plate and guides a moving direction of the moving plate; and a fourth rib which forms a step with the third rib and stops movement of the second moving plate.

The vehicle air skirt apparatus may further include an actuator fixed to the housing, wherein the link assembly may include: a first link connected to the actuator; and a second link which is connected to the first link and the second moving plate and moves the second moving plate in conjunction with movement of the first link.

The first moving plate may include a guide hole which is disposed in a direction in which the second moving plate moves and guides a moving direction of the second link.

The guide may include a rotary pin rotatably coupled to the second guide plate; and a stopper coupled to the rotary pin and rotated around the rotary pin, wherein, in a state before the second guide plate comes into contact with the second rib of the first guide plate, the stopper maintains a state in which contact with the second moving plate.

In case the second guide plate comes into contact with the second rib of the first guide plate, the stopper may be pressed and rotated by the second moving plate which moves in conjunction with the second link.

In another general aspect of the disclosure, an air skirt system for a vehicle includes: a housing having an outlet hole; a skirt including a first skirt and a second skirt which are movably disposed in the housing to protrude outward from the housing through the outlet hole; a guide which is disposed in the housing, the guide including an actuator to move the first skirt and the second skirt; and a controller configured to control the guide to actuate the actuator to guide the first skirt and the second skirt such that, when any one of the first skirt and the second skirt is completely withdrawn into the housing, the other one of the first skirt and the second skirt is additionally withdrawn into the housing.

The system may further include a transceiver, wherein the controller is in communication with the guide via the transceiver.

The first skirt may be positioned adjacent the second skirt.

The first skirt may include a rigid material, and the second skirt may include a flexible material.

The system may further include one or more sensors configured to detect whether the first skirt or the second skirt is completely withdrawn into the housing.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 3 is an exploded perspective view illustrating the vehicle air skirt apparatus according to one embodiment of the present invention;

FIG. 6 is a view illustrating a first guide pin coupled to the first skirt and a second guide pin coupled to the second skirt;

FIG. 7 is a view illustrating the first guide pin disposed in a first guide hole and the second guide pin disposed in a second guide hole;

FIGS. 14A to 14C are views illustrating a first skirt and a second skirt which are disposed at a first position;

DETAILED DESCRIPTION

Figure 1:
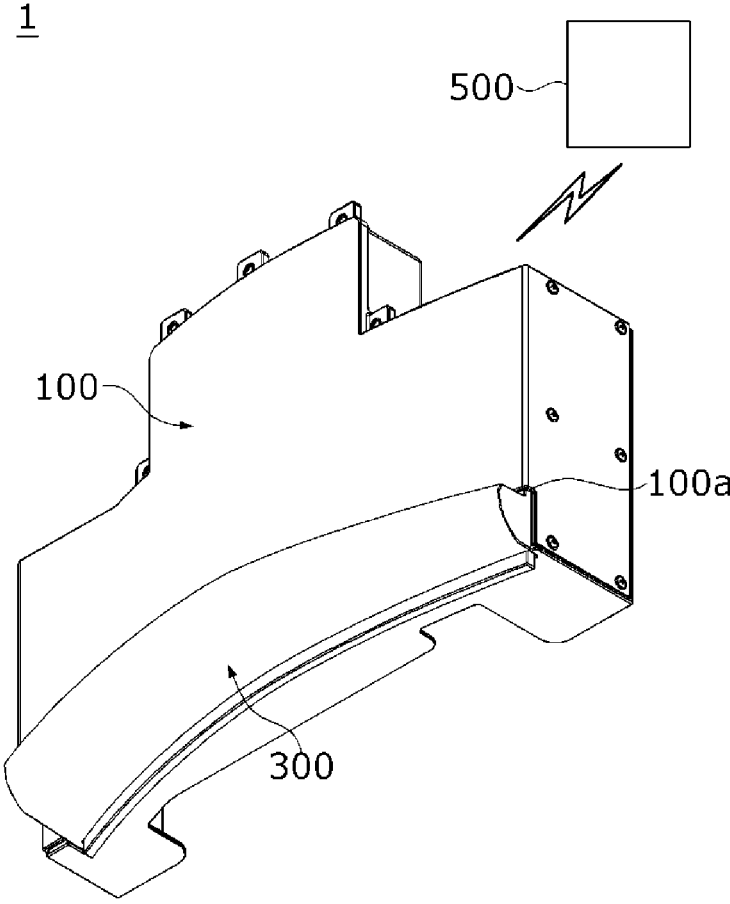
FIG. 1 is a front perspective view illustrating a vehicle air skirt apparatus according to one embodiment of the present invention.

Since the present invention allows various changes and has many embodiments, specific embodiments will be illustrated in the accompanying drawings and described. However, this is not intended to limit the present invention to the specific embodiments, and it is to be appreciated that all changes, equivalents, and substitutes that fall within the spirit and technical scope of the present invention are encompassed in the present invention.

Although the terms "first," "second," and the like may be used herein to describe various elements, these elements should not be limited by these terms. These terms are only used to distinguish one element from another element. For example, a second element could be termed a first element, and a first element could similarly be termed a second element without departing from the scope of the present invention. The term "and/or" includes any one or any combination of a plurality of associated listed items.

When a first element is referred to as being "connected" or "coupled" to a second element, it should be understood that the first element may be directly connected or coupled to the second element, or a third element may be present therebetween. In contrast, when a first element is referred to as being "directly connected" or "directly coupled" to a second element, it will be understood that there are no intervening elements.

In a description of the embodiment, in a case in which any first element is described as being formed on or under a second element, such a description includes both a case in which the two elements are formed in direct contact with each other and a case in which the two elements are in indirect contact with each other with one or more third elements interposed between the two elements. In addition, when a first element is described as being formed on or under a second element, such a description may include a case in which the first element is formed at an upper side or a lower side with respect to the second element.

Terminology used herein is for the purpose of describing particular embodiments only and is not intended to limit the present invention. The singular forms are intended to include the plural forms, unless the context clearly indicates otherwise. In the present specification, it should be further understood that the terms "comprise," "comprising," "include," and/or "including" used herein specify the presence of stated features, numbers, steps, operations, elements, and/or components but do not preclude the presence or addition of one or more other features, numbers, steps, operations, elements, components, and/or groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, a vehicle air skirt apparatus will be described in detail with reference to the accompanying drawings, components that are the same or correspond to each other will be denoted by the same reference numerals, and redundant descriptions thereof will be omitted.

Figure 2:
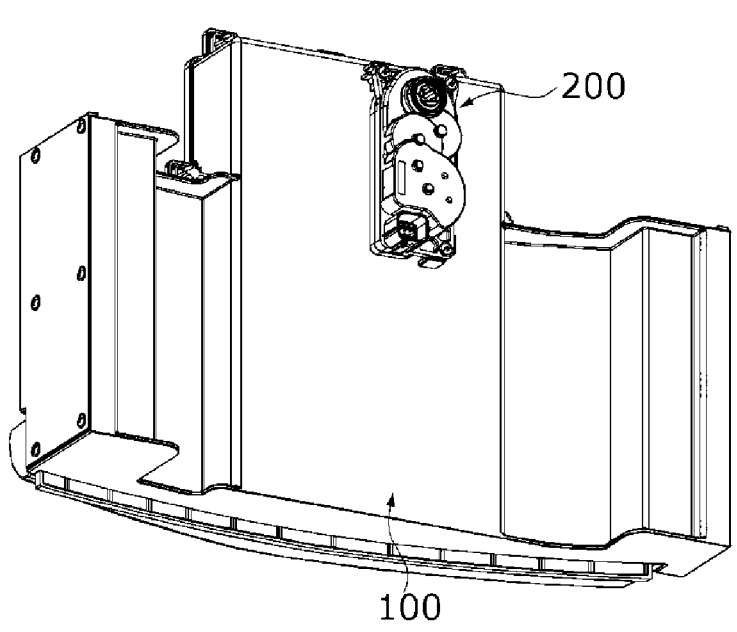
FIG. 2 is a rear perspective view illustrating the vehicle air skirt apparatus according to one embodiment of the present invention.
Figure 3:
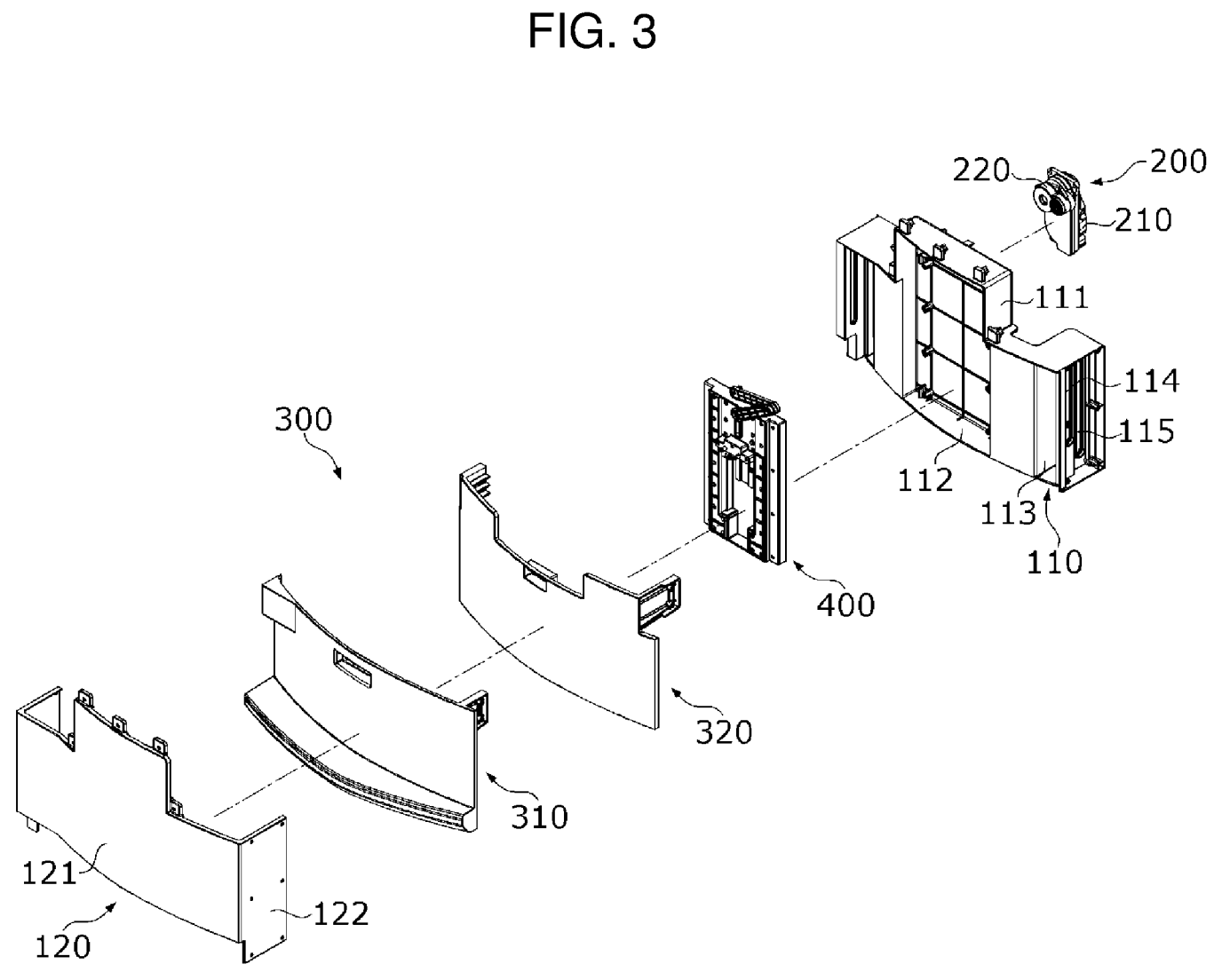

FIG. 1 is a front perspective view illustrating a vehicle air skirt apparatus according to one embodiment of the present invention, FIG. 2 is a rear perspective view illustrating the vehicle air skirt apparatus according to one embodiment of the present invention, and FIG. 3 is an exploded perspective view illustrating the vehicle air skirt apparatus according to one embodiment of the present invention.

Referring to FIGS. 1 to 3, a vehicle air skirt apparatus 1 according to one embodiment of the present invention may be disposed in a bumper of a vehicle. The vehicle air skirt apparatus 1 may block a headwind from passing under the bumper (not shown) of the vehicle in a longitudinal direction of the vehicle. In this case, the longitudinal direction may be a direction from a passenger room (not shown) toward an engine room (not shown) of the vehicle or a direction opposite thereto. The vehicle air skirt apparatus 1 includes a housing unit 100, an actuator 200, a skirt unit 300, a guide unit 400, and a control unit 500.

An outlet hole 100a may be formed in the housing unit 100. The outlet hole 100a may form a passage through which a first skirt 310 and a second skirt 320, which will be described below, move to allow the first skirt 310 and the second skirt 320 to protrude and be exposed to the outside of the housing unit 100 or to prevent the first skirt 310 and the second skirt 320 from protruding to the outside of the housing unit 100. The housing unit 100 may include a first housing 110 and a second housing 120.

The first housing 110 may include the skirt unit 300, the actuator 200, and the guide unit 400. The first housing 110 may include a housing body 111, a first accommodation groove 112, a second accommodation groove 113, a first guide hole 114, and a second guide hole 115.

The housing body 111 may form an exterior of the first housing 110. The housing body 111 may support the second housing 120.

Figure 8A:
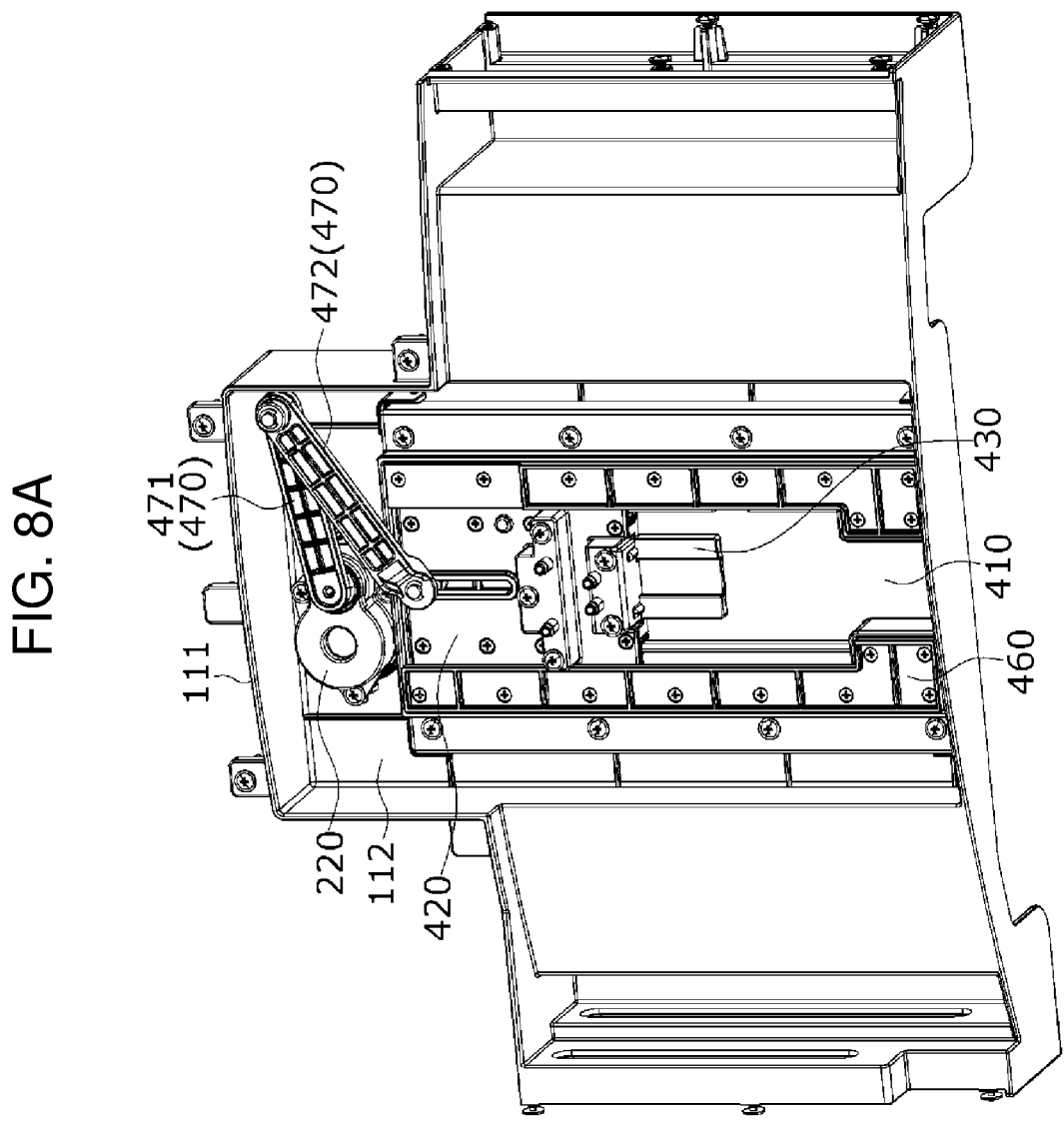
FIG. 8A is a view illustrating an actuator and a guide unit disposed in a housing.

The first accommodation groove 112 may be disposed between a plurality of second accommodation grooves 113. As illustrated in FIG. 8A, the first accommodation groove 112 may accommodate the guide unit 400 therein, which will be described below. In addition, the first accommodation groove 112 may accommodate a gear part 220 of the actuator 200 therein, which will be described below.

The plurality of second accommodation grooves 113 may be formed in the housing body 111. The second accommodation grooves 113 may be disposed to be spaced apart from each other with the first accommodation groove 112 interposed therebetween. The second accommodation grooves 113 may form a space in which a first connecting part 313 of the first skirt 310 and a second connecting part 322 of the second skirt 320, which will be described below, are movable.

The first guide hole 114 and the second guide hole 115 may be formed in an outer surface of the housing body 111 forming the second accommodation groove 113. The first guide hole 114 and the second guide hole 115 may be disposed to be spaced apart from each other in a width direction. In this case, the width direction may be a direction intersecting the longitudinal direction. The first guide hole 114 may be disposed closer to the skirt unit 300 than the second guide hole 115 in the width direction. The first guide hole 114 may movably accommodate a first guide pin 330 of the skirt unit 300, which will be described below, and the second guide hole 115 may movably accommodate a second guide pin 340 of the skirt unit 300, which will be described below.

As illustrated in FIG. 3, a length of the second guide hole 115 may be greater than a length of the first guide hole 114 in a height direction. Accordingly, the second skirt 320, which will be described below and moves along the second guide hole 115, may protrude downward from the first skirt 310 in the height direction. In this case, the height direction may perpendicularly intersect the longitudinal direction and the width direction.

The second housing 120 may be coupled to the first housing 110. The second housing 120 and the first housing 110 may form the outlet hole 100a. The second housing 120 may prevent the gear part 220 of the actuator 200, which will be described below, disposed in the first housing 110 and the guide unit 400 from escaping to the outside of the first housing 110. In addition, the second housing 120 may block foreign matter, such as a stone that may be collided with, while the vehicle travels from being introduced into the first housing 110. The second housing 120 may include a main portion 121 and a side portion 122.

The main portion 121 may cover an open one side of the first housing 110. The side portion 122 may be disposed on each of both end portions of the main portion 121 in the longitudinal direction and may cover one side of each of the first guide hole 114 and the second guide hole 115 of the first housing 110. Accordingly, the side portion 122 may prevent the first guide pin 330 and the second guide pin 340, which will be described below, from escaping to the outside of the housing unit 100.

As illustrated in FIG. 3, the side portion 122 may protrude further downward from the main portion 121 in the height direction. Accordingly, the side portion 122, the first housing 110, and the main portion 121 may form the outlet hole 100a. In addition, since the side portion 122 protrudes further downward from the main portion 121, the second housing 120 may form a space in which a second blocking part 312 of the first skirt 310, which will be described below, is disposed.

The actuator 200 may be fixed to the housing unit 100. The actuator 200 may be connected to an external power supply source which supplies electric power and may receive the electric power from the power supply source to generate power. The actuator 200 may include a power generation part 210 and the gear part 220.

The power generation part 210 may be disposed on an outer surface of the first housing 110. More specifically, the power generation part 210 may be disposed on the outer surface of the housing body 111 of the first housing 110 forming the first accommodation groove 112. The power generation part 210 may receive a control signal of the control unit 500 to generate power.

The gear part 220 may be disposed on an inner surface of the first housing 110. More specifically, the gear part 220 may be disposed on an inner surface of the housing body 111 of the first housing 110 forming the first accommodation groove 112. The gear part 220 may include a plurality of gears connected to the power generation part 210 and rotated by the power generated by the power generation part 210. The gear part 220 may be coupled to a first link 471 of a link assembly 470 which will be described below.

The skirt unit 300 may include the first skirt 310 and the second skirt 320 which are disposed to move in the housing unit 100 to protrude outward from the housing unit 100 through the outlet hole 100a. In addition, the skirt unit 300 may include the first guide pin 330 and the second guide pin 340.

Figure 4:
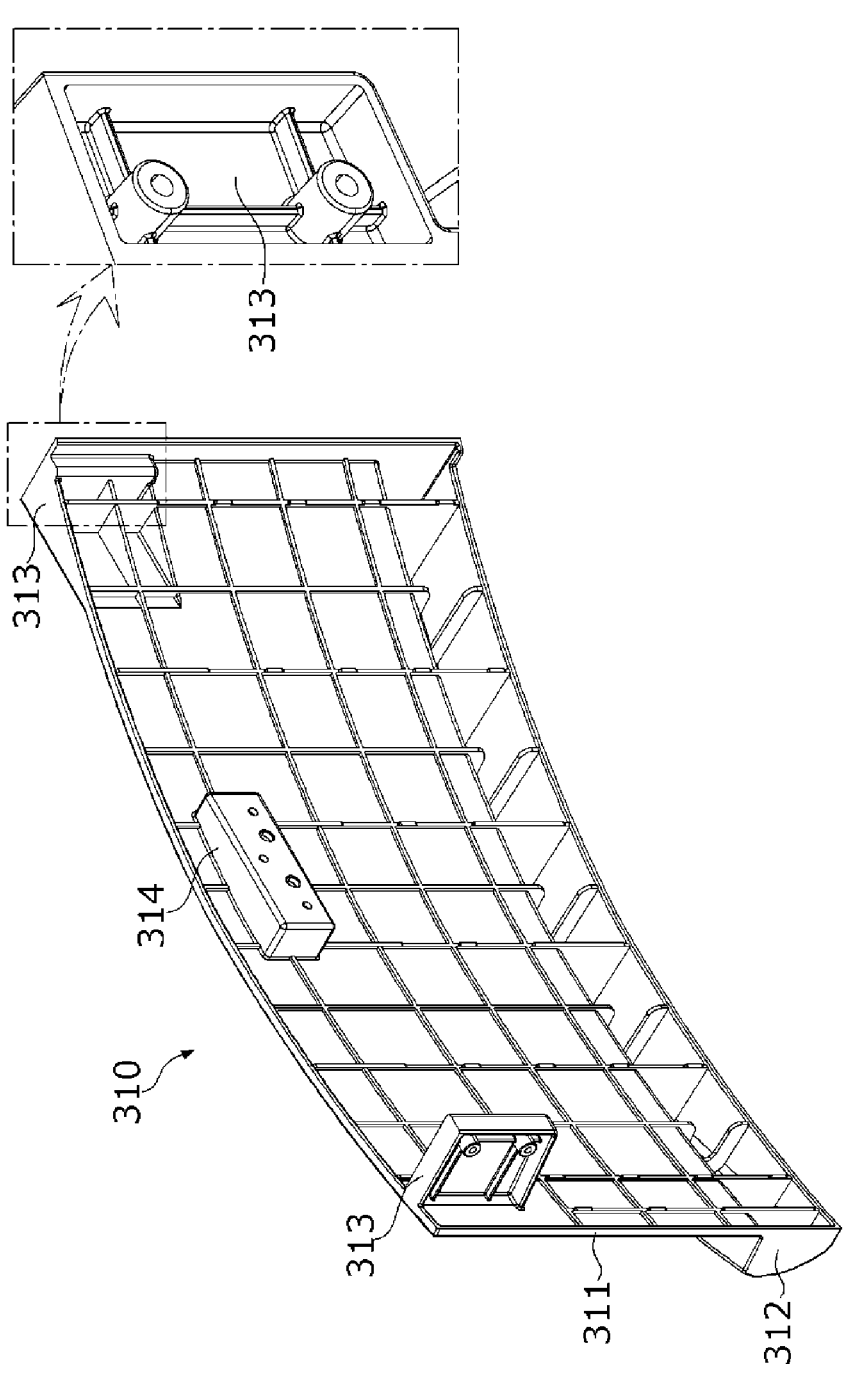
FIG. 4 is a rear perspective view illustrating a first skirt.
Figure 5:
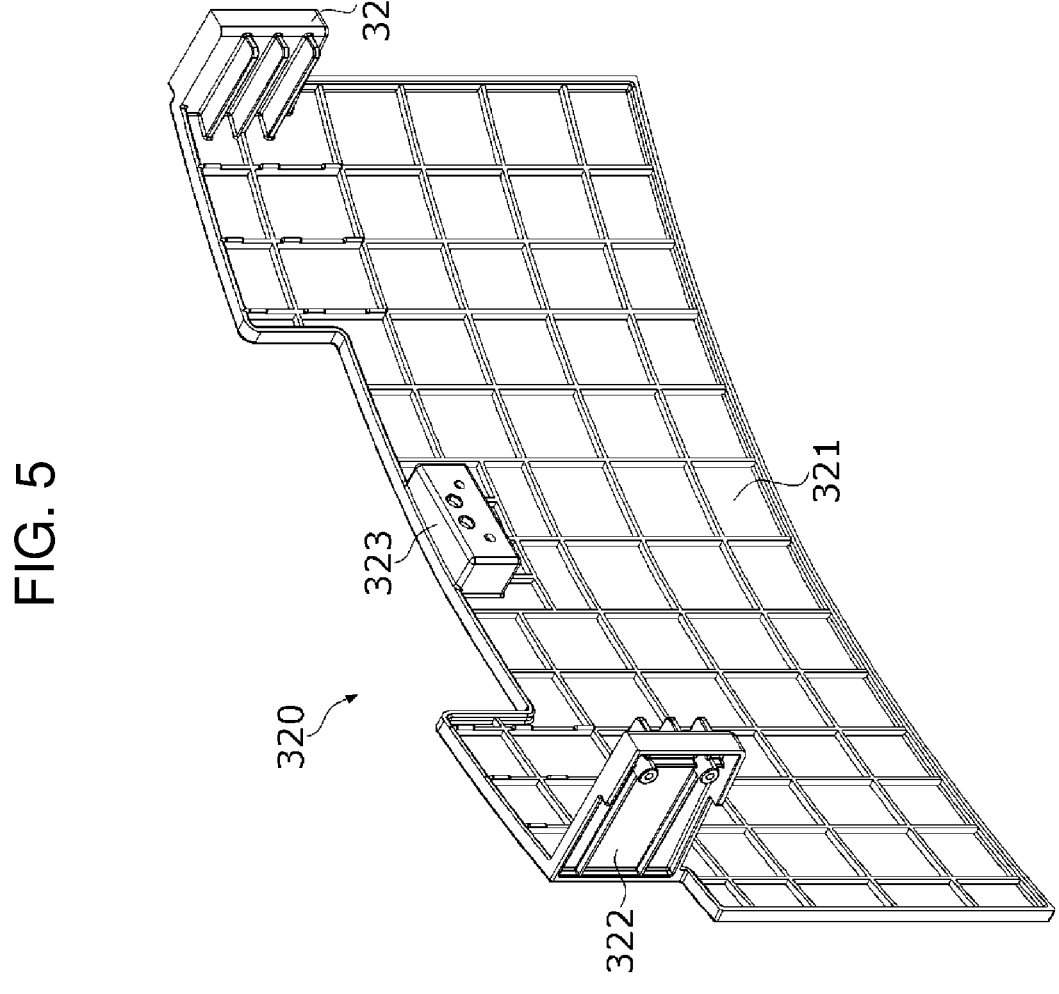
FIG. 5 is a rear perspective view illustrating a second skirt.
Figure 6:
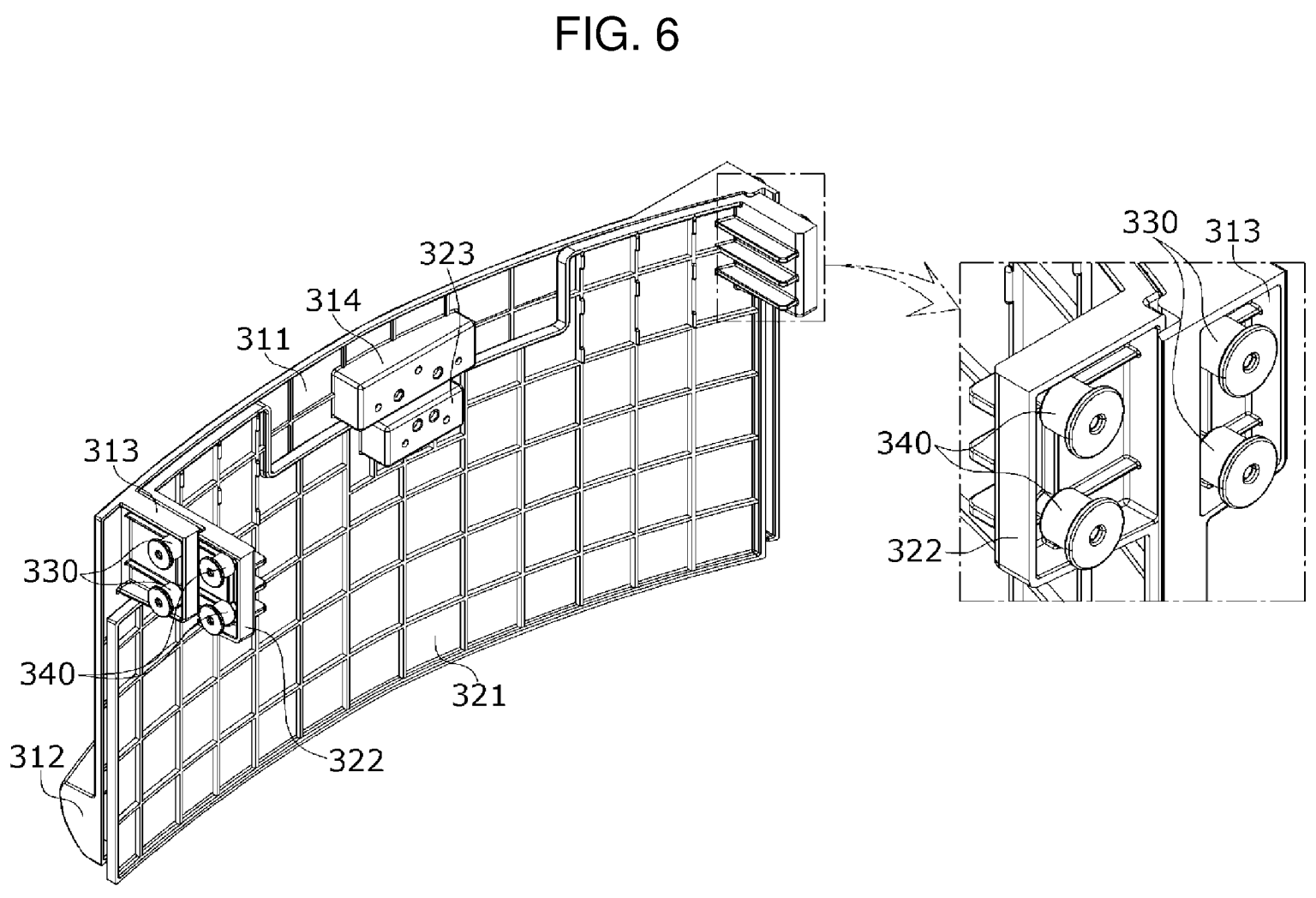

FIG. 4 is a rear perspective view illustrating the first skirt, and FIG. 5 is a rear perspective view illustrating the second skirt. FIG. 6 is a view illustrating a first guide pin coupled to the first skirt and a second guide pin coupled to the second skirt, and FIG. 7 is a view illustrating the first guide pin disposed in the first guide hole and the second guide pin disposed in the second guide hole.

Figure 7:
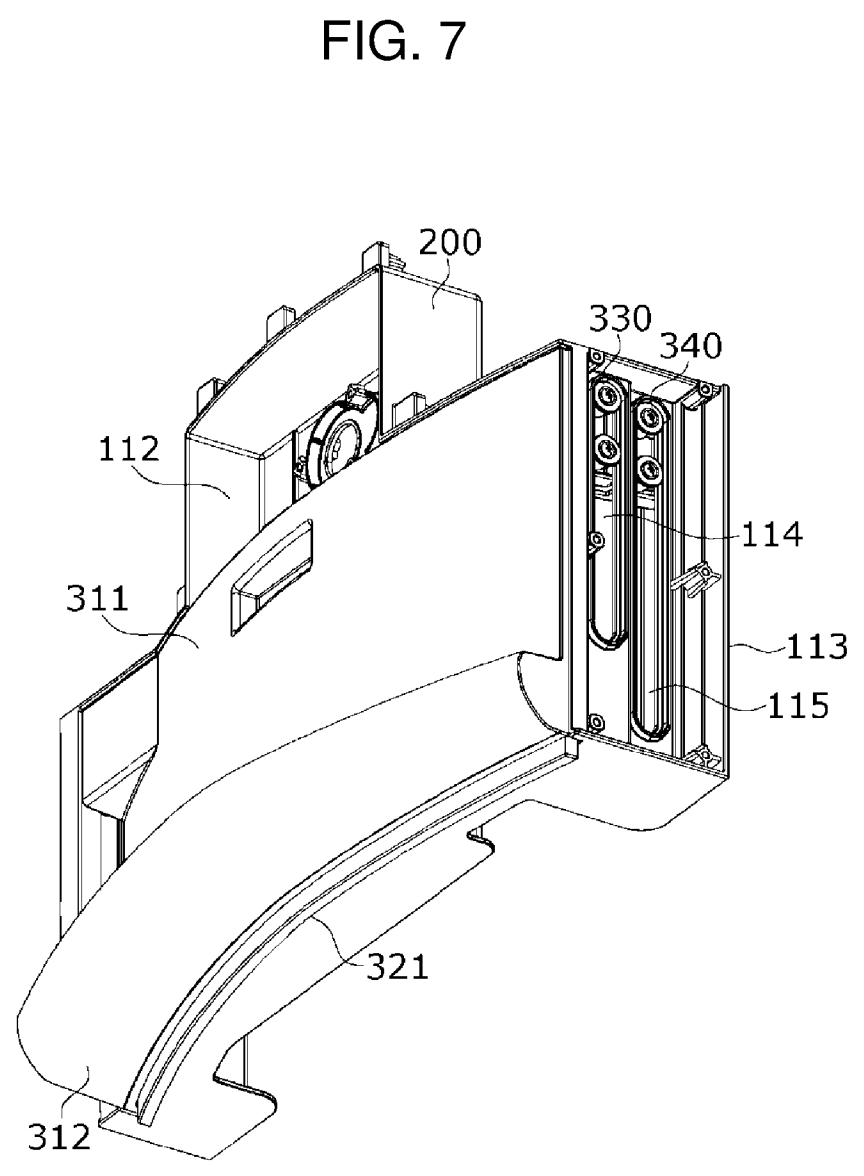

Referring to FIGS. 3, 4, and 7, the first skirt 310 may be a first part which blocks a flow of headwind and may be moved in the height direction by the guide unit 400. The first skirt 310 may include a first blocking part 311, the second blocking part 312, the first connecting part 313, and a first protruding portion 314. The first skirt 310 may be formed of a material having high rigidity so as not to be pushed back by headwind.

The first blocking part 311 may cover the open one side of the first housing 110 of the housing unit 100. The first blocking part 311 may have a curved shape but is not limited thereto. The first blocking part 311 may support the first connecting part 313.

The second blocking part 312 may be disposed on an end portion of the first blocking part 311 in the height direction. The second blocking part 312 may have a shape protruding from the end portion of the first blocking part 311 in the width direction. The second blocking part 312 passes through the outlet hole 100a and is disposed outside the second housing 120. The second blocking part 312 may be disposed under the bumper of the vehicle in the height direction in a state in which the second blocking part 312 does not protrude so that the first blocking part 311 is exposed to the outside of the vehicle. That is, the second blocking part 312 may block a headwind and may also be always exposed to the outside of the vehicle, and the second blocking part 312 may be a part for improving design aesthetics of the vehicle.

The first connecting part 313 may be disposed on each of both end portions of the first blocking part 311 and the second blocking part 312 in the width direction. The first connecting part 313 may be disposed in the second accommodation groove 113 of the first housing 110 of the housing unit 100. The first connecting part 313 may be coupled to the first guide pin 330 which will be described below. The first connecting part 313 may move in the second accommodation groove 113 in the height direction in conjunction with movement of the first guide pin 330. When the first connecting part 313 moves, the first blocking part 311 and the second blocking part 312 which are connected to the first connecting part 313 may move in the height direction.

The first protruding portion 314 may be formed on a surface of the first blocking part 311 on which the second blocking part 312 is not disposed. The first protruding portion 314 may have a shape protruding from one surface of the first blocking part 311 in the width direction. The first protruding portion 314 may be coupled to a third protruding portion 421c of a first moving plate 421 which will be described below. Accordingly, when the first moving plate 421 moves, the first protruding portion 314 may move along the first moving plate 421, and this may mean that the first skirt 310 moves along the first moving plate 421. The first protruding portion 314 may be fixed to the first moving plate 421 using a coupling member such as a bolt.

Referring to FIGS. 3 and 5 to 7, the second skirt 320 may be disposed between the first housing 110 and the first skirt 310. The second skirt 320 may be a second part which block the flow of the headwind and may be moved in the height direction by the guide unit 400. The second skirt 320 may include a third blocking part 321, the second connecting part 322, and a second protruding portion 323. The second skirt 320 may be formed of a flexible material to pass without being damaged by foreign matter such as a stone present on a road surface. For example, the second skirt 320 may be formed of a rubber material.

The third blocking part 321 may cover the open one side of the first housing 110 of the housing unit 100. The third blocking part 321 may have a curved shape corresponding to the first blocking part 311 of the first skirt 310 but is not limited thereto. The third blocking part 321 may support the second connecting part 322.

The second connecting part 322 may be disposed on each of both end portions of the third blocking part 321 in the width direction. The second connecting part 322 may be disposed in the second accommodation groove 113 of the first housing 110 of the housing unit 100. The second connecting part 322 may be coupled to the second guide pin 340 which will be described below. The second connecting part 322 may move in the second accommodation groove 113 in the height direction in conjunction with movement of the second guide pin 340. When the second connecting part 322 moves, the third blocking part 321 connected to the second connecting part 322 may move in the height direction.

The second protruding portion 323 may be formed on a surface of the second blocking part 312 which does not face the first skirt 310. The second protruding portion 323 may have a shape protruding from one surface of the third blocking part 321 in the width direction. The second protruding portion 323 may be coupled to a fourth protruding portion 422c of a second moving plate 422 which will be described below. Accordingly, when the second moving plate 422 moves, the second protruding portion 323 moves along the second moving plate 422, and this may mean that the second skirt 320 moves along the second moving plate 422. The second protruding portion 323 may be fixed to the second moving plate 422 using a coupling member such as a bolt.

The first guide pin 330 and the second guide pin 340 may have hollow cylindrical shapes. The first guide pin 330 may be coupled to the first connecting part 313 of the first skirt 310, and the second guide pin 340 may be connected to the second connecting part 322 of the second skirt 320. The first guide pin 330 may be movably disposed in the first guide hole 114 of the housing unit 100, and the second guide pin 340 may be movably disposed in the second guide hole 115 of the housing unit 100. As described above, the first guide pin 330 and the second guide pin 340 may assist movement of the first skirt 310 or the second skirt 320.

Figure 8B:
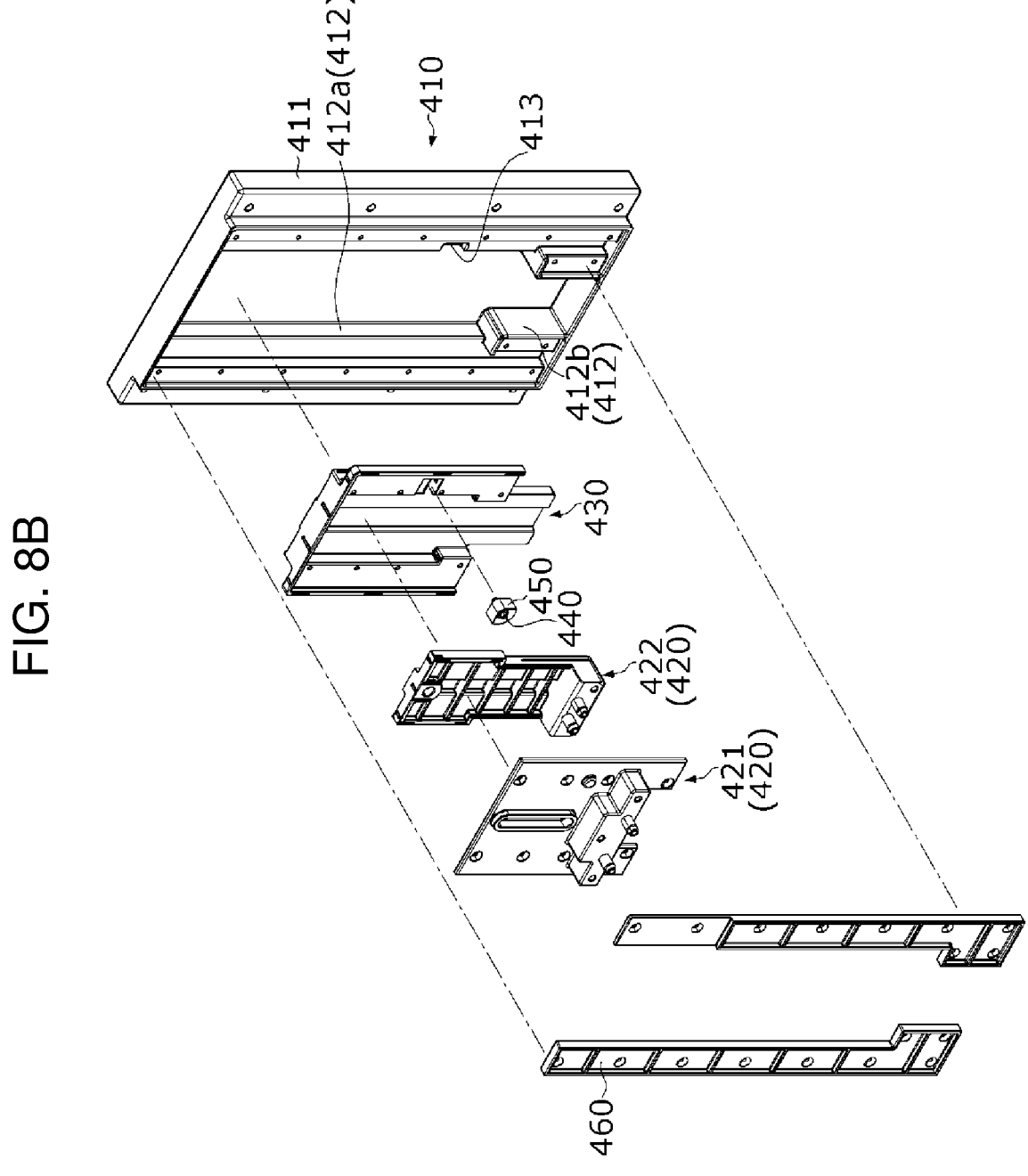
FIG. 8B is an exploded perspective view illustrating the guide unit.

FIG. 8A is a view illustrating the actuator and the guide unit disposed in a housing, and FIG. 8B is an exploded perspective view illustrating the guide unit.

The guide unit 400 may be disposed in the housing unit 100 and may guide the first skirt 310 and the second skirt 320 so that any one of the first skirt 310 and the second skirt 320 is completely withdrawn and then the other one of the first skirt 310 and the second skirt 320 is additionally withdrawn. The guide unit 400 may include a first guide plate 410, a moving plate 420, a second guide plate 430, a rotary pin 440, a stopper 450, a guide cover 460, and a link assembly 470.

The first guide plate 410 may be fixedly installed in the housing unit 100. The first guide plate 410 may be disposed in the first accommodation groove 112 of the first housing 110 of the housing unit 100. More specifically, the first guide plate 410 may be coupled to the inner surface of the first housing 110 forming the first accommodation groove 112. The first guide plate 410 may include a first plate body 411, a first guide rib 412, and an arrangement groove 413.

The first plate body 411 may form an exterior of the first guide plate 410. The first plate body 411 may be fixed to the first housing 110 using a coupling member such as a bolt.

The first guide rib 412 may be disposed on the first plate body 411 in the height direction. The first guide rib 412 may include a first rib 412a and a second rib 412b.

The plurality of first ribs 412a may be disposed on the first plate body 411, and the plurality of first ribs 412a may be disposed to be spaced apart from the first plate body 411 in the longitudinal direction. The plurality of first ribs 412a may form a moving space of the moving plate 420 and guide a moving direction of the moving plate 420.

The second rib 412b may be disposed on a lower end portion of the first rib 412a in the height direction. The second rib 412b may be disposed inside the first rib 412a.

The second rib 412*b* may be provided as a plurality of second ribs 412*b* disposed on the first plate body 411 to be spaced apart from each other on the first plate body 411 in the longitudinal direction. In this case, since the second ribs 412*b* are disposed inside the first ribs 412*a*, a distance between the second ribs 412*b* may be smaller than a distance between the first ribs 412*a*. That is, the second ribs 412*b* and the first ribs 412*a* may form steps and stop movement of the first moving plate 421 which will be described below.

The arrangement groove 413 may be disposed in the first rib 412*a*. The arrangement groove 413 may accommodate the stopper 450 therein. More specifically, when the stopper 450 disposed at a second position P2 rotates, the arrangement groove 413 may accommodate the rotated stopper 450 therein. Accordingly, a length of the arrangement groove 413 may be greater than a length of the stopper 450 in a radial direction.

The moving plate 420 may be movably disposed between the first guide ribs 412 and may move the first skirt 310 and the second skirt 320. The moving plate 420 may include the first moving plate 421 and the second moving plate 422.

Figure 9:
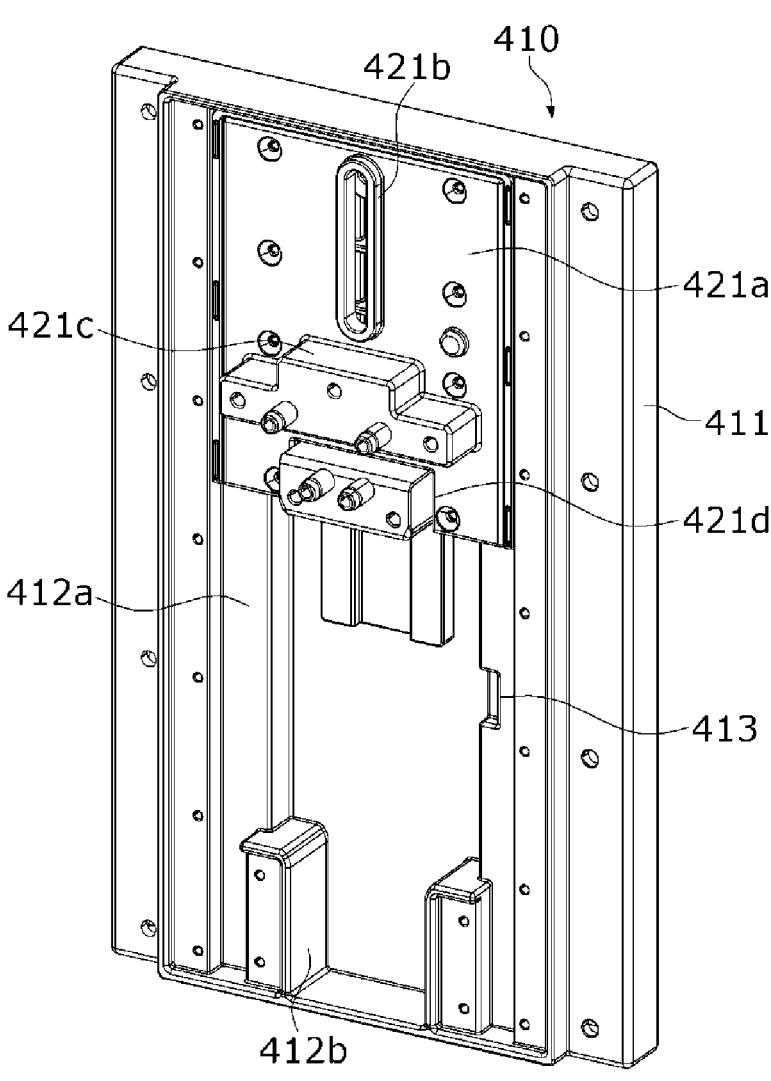
FIG. 9 is a view illustrating a first moving plate coupled to a second guide plate.

FIG. 9 is a view illustrating the first moving plate coupled to the second guide plate.

Referring to FIGS. 8A to 9, the first moving plate 421 may be connected to the first skirt 310 to move the first skirt 310. The first moving plate 421 may include a second plate body 421*a*, a third guide hole 421*b*, the third protruding portion 421*c*, and a third accommodation groove 421*d*.

The second plate body 421*a* may form an exterior of the first moving plate 421. The second plate body 421*a* may be coupled to the first plate body 411 of the first guide plate 410 and fixed to the first plate body 411 using a coupling member such as a bolt. That is, the first moving plate 421 moves with the first guide plate 410 in a state in which the first moving plate 421 is fixed to the first guide plate 410. The second plate body 421*a* and the first plate body 411 of the first guide plate 410 may form a space for accommodating the second moving plate 422 therein.

As illustrated in FIG. 9, the third guide hole 421*b* may be disposed in the same direction (height direction) as a direction in which the second moving plate 422 moves, and may guide a moving direction of a second link 472 which will be described below. The third guide hole 421*b* may have a long hole shape.

The third protruding portion 421*c* may be disposed under the third guide hole 421*b* in the height direction. The third protruding portion 421*c* may protrude from the second plate body 421*a* in the width direction. The third protruding portion 421*c* may be coupled to the first protruding portion 314 of the first skirt 310. The first skirt 310 connected to the third protruding portion 421*c* may move in the height direction in conjunction with movement of the first moving plate 421.

The third accommodation groove 421*d* may be disposed under the third protruding portion 421*c* in the height direction. Since the third accommodation groove 421*d* is formed on an end portion of the second plate body 421*a*, the third accommodation groove 421*d* may have an open one side. The third accommodation groove 421*d* may accommodate the fourth protruding portion 422*c* of the second moving plate 422, which will be described below.

Figure 10:
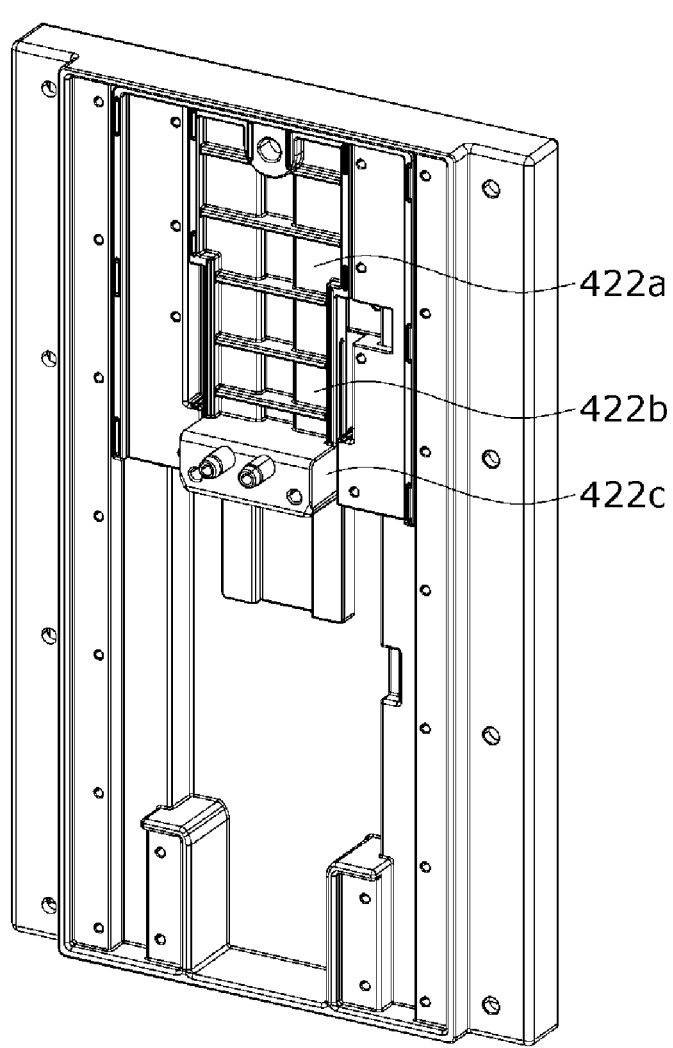
FIG. 10 is a view illustrating a second moving plate coupled to the second guide plate.
Figure 11:
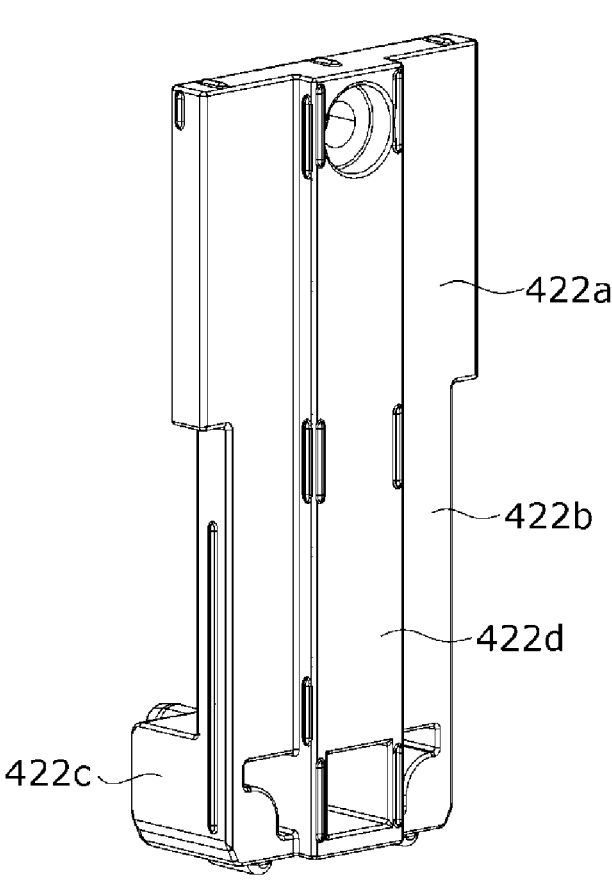
FIG. 11 is a rear perspective view illustrating the second moving plate.

FIG. 10 is a view illustrating the second moving plate coupled to the second guide plate, and FIG. 11 is a rear perspective view illustrating the second moving plate.

Referring to FIGS. 8A to 11, the second moving plate 422 may be connected to the second skirt 320 and may move the second skirt 320. The second moving plate 422 may include a third plate body 422*a*, a fourth plate body 422*b*, the fourth protruding portion 422*c*, and a fifth protruding portion 422*d*.

The third plate body 422*a* may form an exterior of the second moving plate 422. The third plate body 422*a* may be movably coupled to the second guide plate 430. More specifically, the third plate body 422*a* may be disposed between a plurality of third ribs 433 of the second guide plate 430, which will be described below.

The fourth plate body 422*b* may be disposed on an end portion of the third plate body 422*a*. A length of the fourth plate body 422*b* may be smaller than a length of the third plate body 422*a* in the longitudinal direction. Accordingly, the fourth plate body 422*b* may have a shape to be stepped with the third plate body 422*a*. Accordingly, in the third plate body 422*a*, a region in contact with a fourth rib 434 of the second guide plate 430, which will be described below, may be formed due to the fourth plate body 422*b*.

The fourth plate body 422*b* and the third plate body 422*a* may be movably coupled to the second guide plate 430. More specifically, the fourth plate body 422*b* may be disposed between the plurality of third ribs 433 and a plurality of fourth ribs 434 of the second guide plate 430, which will be described below.

As illustrated in FIG. 10, the fourth protruding portion 422*c* may be disposed on an end portion of the fourth plate body 422*b*. The fourth protruding portion 422*c* may protrude from the end portion of the fourth plate body 422*b* in the width direction. The fourth protruding portion 422*c* may be coupled to the second protruding portion 323 of the second skirt 320. Accordingly, when the fourth protruding portion 422*c* moves, the second skirt 320 may move in the height direction in conjunction with movement of the fourth protruding portion 422*c*.

As illustrated in FIG. 11, the fifth protruding portion 422*d* may be formed on a surface facing the second guide plate 430 on the third plate body 422*a* and the fourth plate body 422*b*. The fifth protruding portion 422*d* may be formed over the third plate body 422*a* and the fourth plate body 422*b* in the height direction. The fifth protruding portion 422*d* may be movably disposed in a guide groove 432 of the second guide plate 430, which will be described below. The fourth protruding portion 422*c* may move according to movement of the fifth protruding portion 422*d*, and this means that the second skirt 320 coupled to the fourth protruding portion 422*c* are movable.

Figure 12:
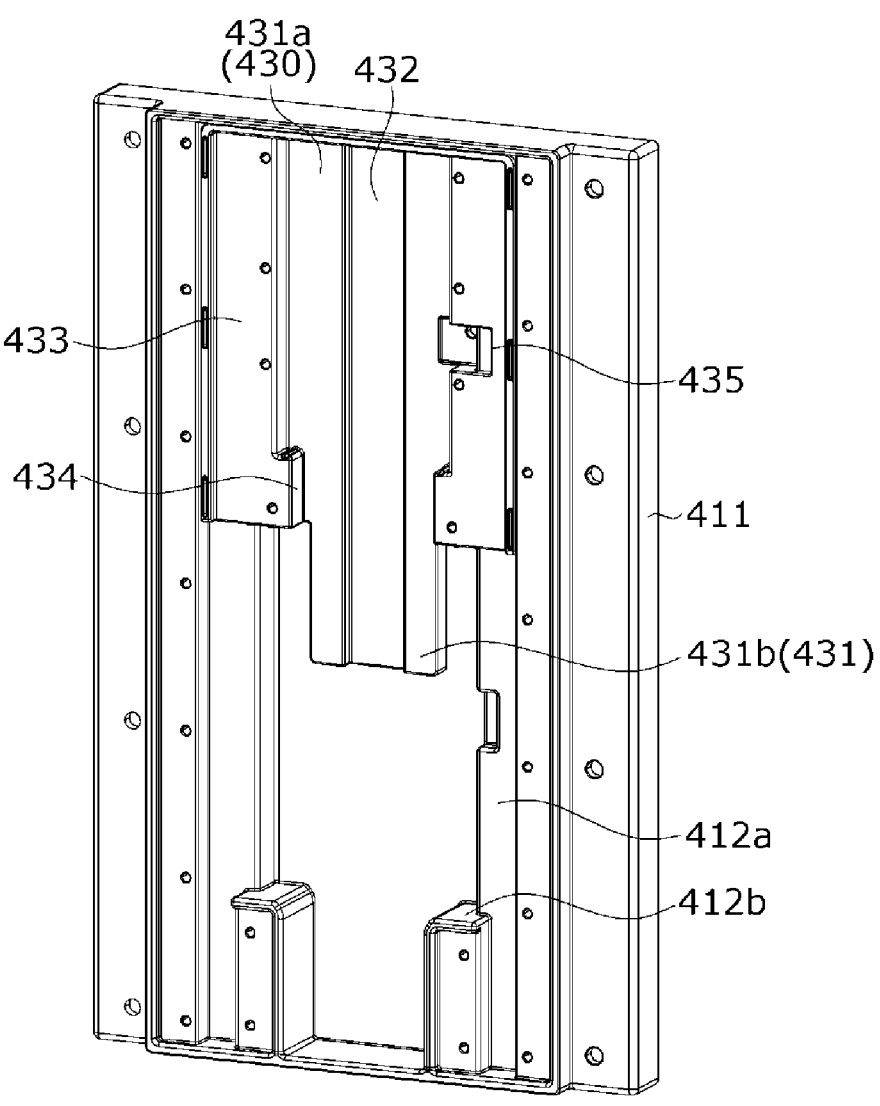
FIG. 12 is a view illustrating the second guide plate coupled to a first guide plate.

FIG. 12 is a view illustrating the second guide plate coupled to the first guide plate.

Referring to FIGS. 8A to 10 and 12, the second guide plate 430 may be disposed between the first guide plate 410 and the first moving plate 421 and may guide a moving direction of the second moving plate 422. The second guide plate 430 may include a fifth plate body 431, the guide groove 432, the third rib 433, the fourth rib 434, and a fourth accommodation groove 435.

As illustrated in FIG. 12, the fifth plate body 431 may be movably disposed on the first plate body 411 of the first guide plate 410. More specifically, the fifth plate body 431 may be movably coupled to the first rib 412*a* of the first guide plate 410. The fifth plate body 431 may be formed as a combination of an exterior portion 431*a* having a rectangular exterior and an extending portion 431*b* extending from an end portion of the exterior portion 431*a* in the height direction.

The guide groove 432 may be formed in the fifth plate body 431. The guide groove 432 may be disposed across the exterior portion 431*a* and the extending portion 431*b* of the fifth plate body 431 therein. The guide groove 432 may be disposed in the exterior portion 431*a* and the extending portion 431*b* of the fifth plate body 431 in the height direction. The guide groove 432 may accommodate the fifth protruding portion 422*d* of the second moving plate 422 so that the fifth protruding portion 422*d* is slid.

A height of the extending portion 431*b* of the fifth plate body 431 may correspond to a height of the second rib 412*b* of the first guide plate 410. Accordingly, when the second guide plate 430 moves, the exterior portion 431*a* may come into contact with the second rib 412*b* of the first guide plate 410. Accordingly, movement of the second guide plate 430 may be stopped, and thus a state in which the rotary pin 440, which will be described below, is rotated may be made.

The third rib 433 may be formed on the exterior portion 431*a* of the fifth plate body 431. The third rib 433 may be disposed on the exterior portion 431*a* of the fifth plate body 431 in the height direction. The third rib 433 may form a moving space of the second moving plate 422 and guide the moving direction of the moving plate 420. The third rib 433 may be provided as the plurality of third ribs 433 disposed on the exterior portion 431*a* of the fifth plate body 431 to be spaced apart from each other in the longitudinal direction.

The fourth rib 434 may be disposed on an end portion of the third rib 433. The fourth rib 434 may protrude from the end portion of the third rib 433 in the longitudinal direction.

Figure 16A:
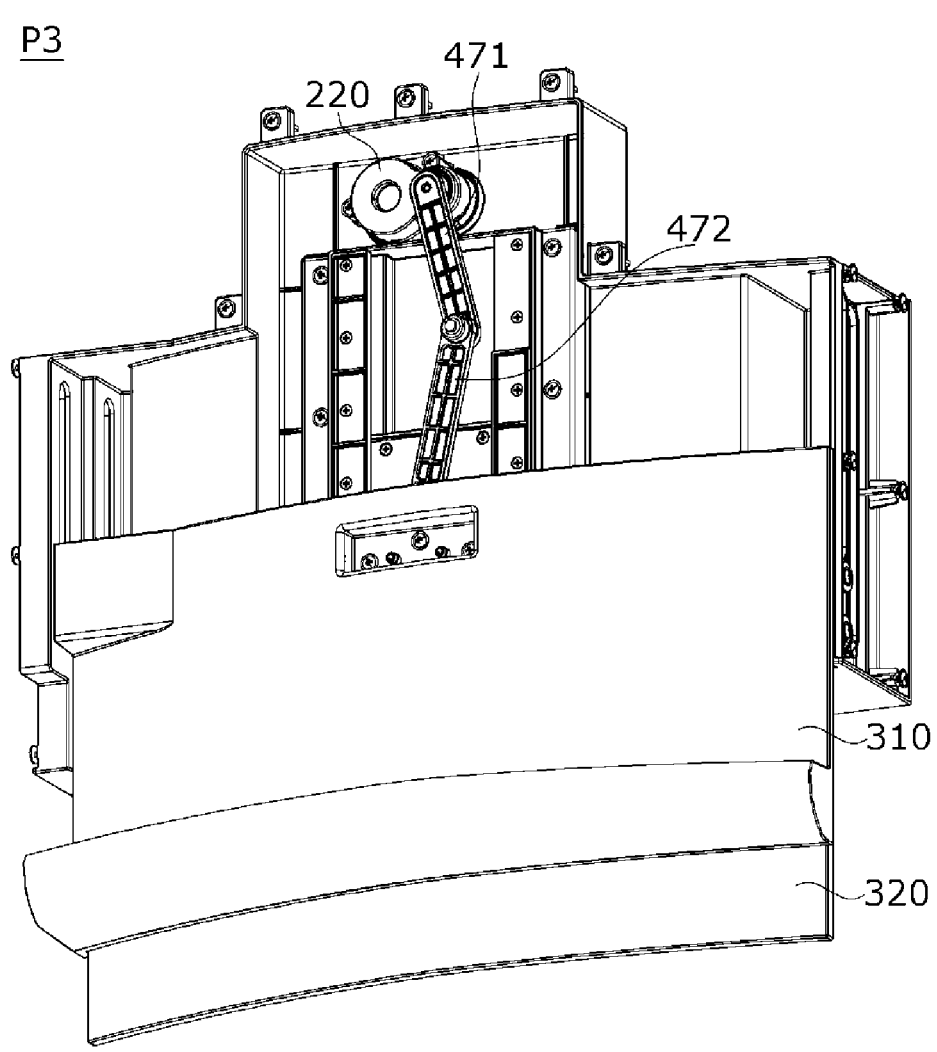
FIGS. 16A to 16D are views illustrating the second skirt disposed at a third position.
Figure 16B:
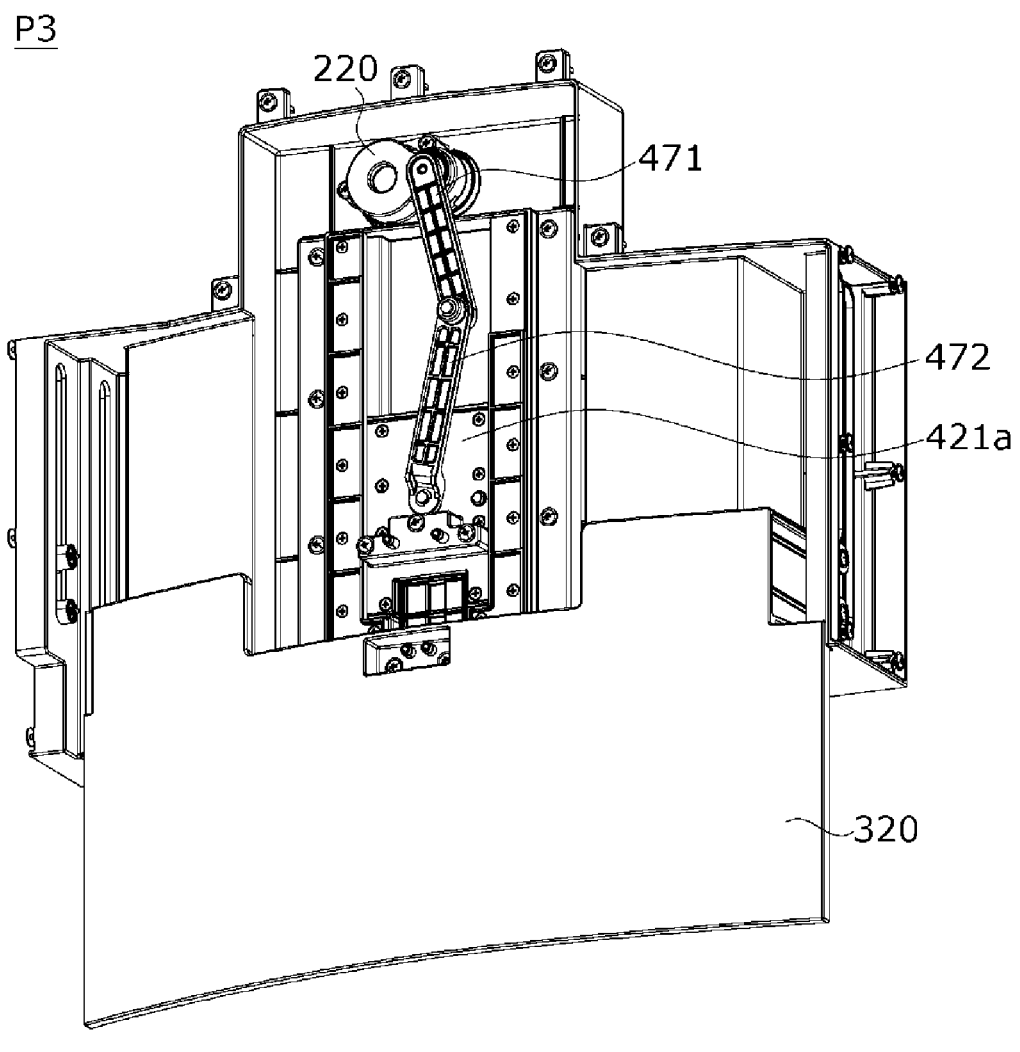
Figure 16C:
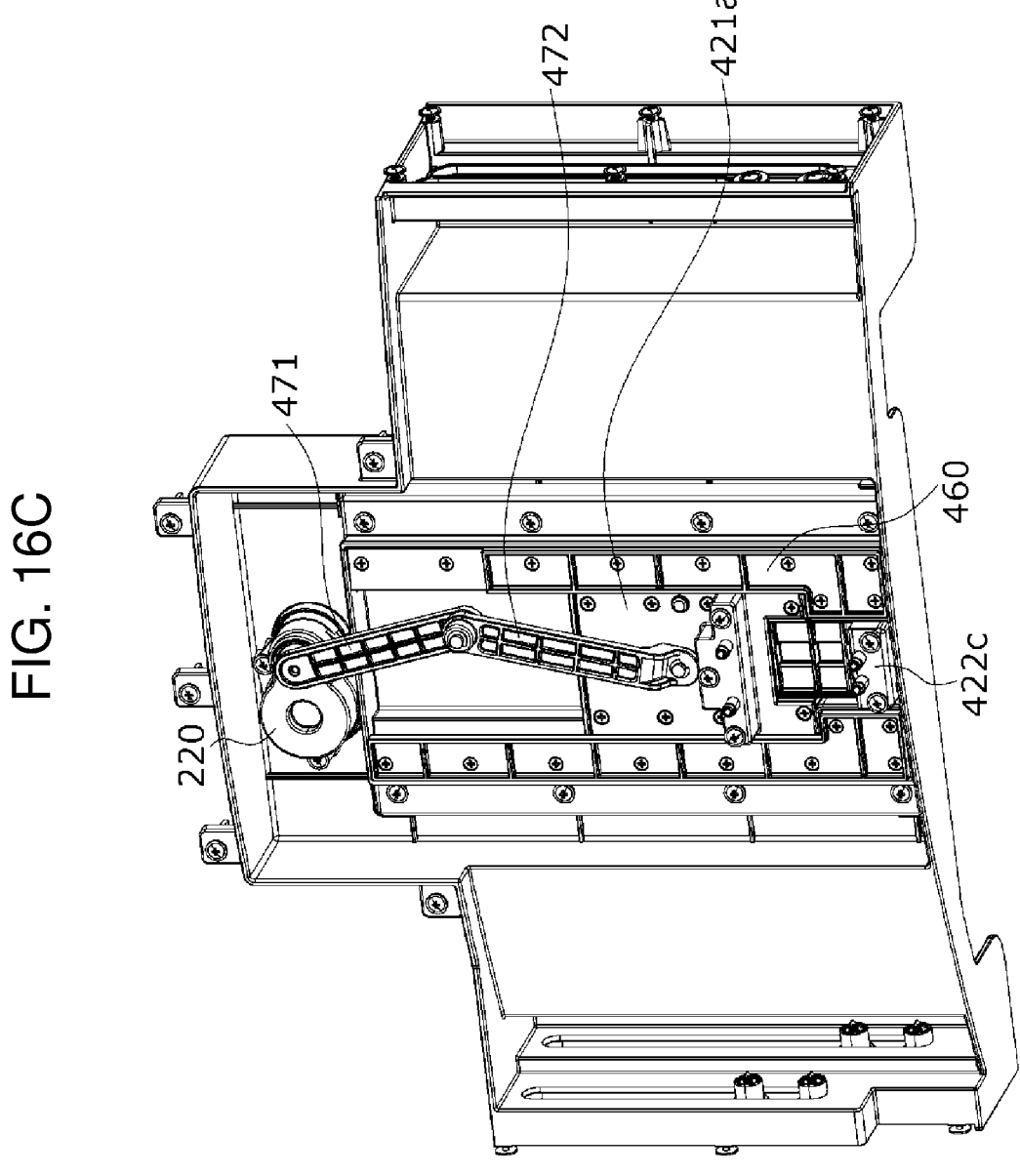
Figure 16D:
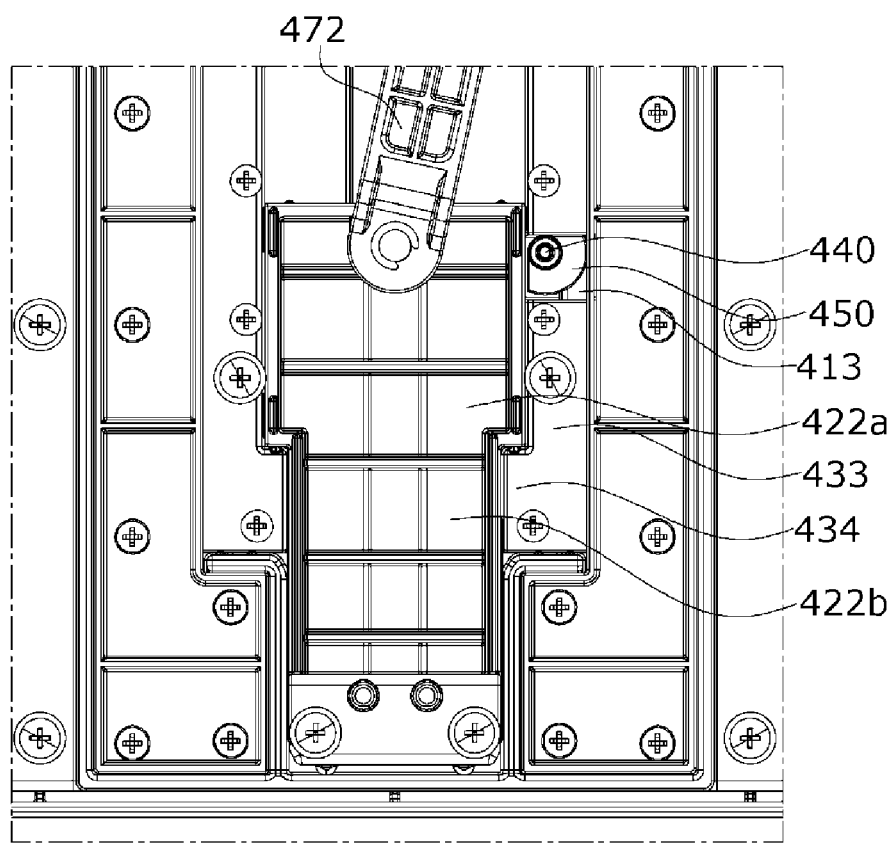

The fourth rib 434 and the third rib 433 may form a step and stop movement of the second moving plate 422. As illustrated in FIG. 16D which will be described below, the fourth rib 434 may be in contact with the third plate body 422*a* of the second moving plate 422. Accordingly, the movement of the second moving plate 422 may be stopped, and this may mean that movement of the second skirt 320 may be stopped ultimately.

The fourth rib 434 may preferably have a height for preventing the second skirt 320 from coming into contact with the road surface when the second skirt 320 coupled to the second moving plate 422 moves downward in the height direction. More specifically, the second skirt 320 may preferably have the height for preventing the second skirt 320 from coming into contact with the road surface when the fourth rib 434 is in contact with the third plate body 422*a*.

Figure 14A:
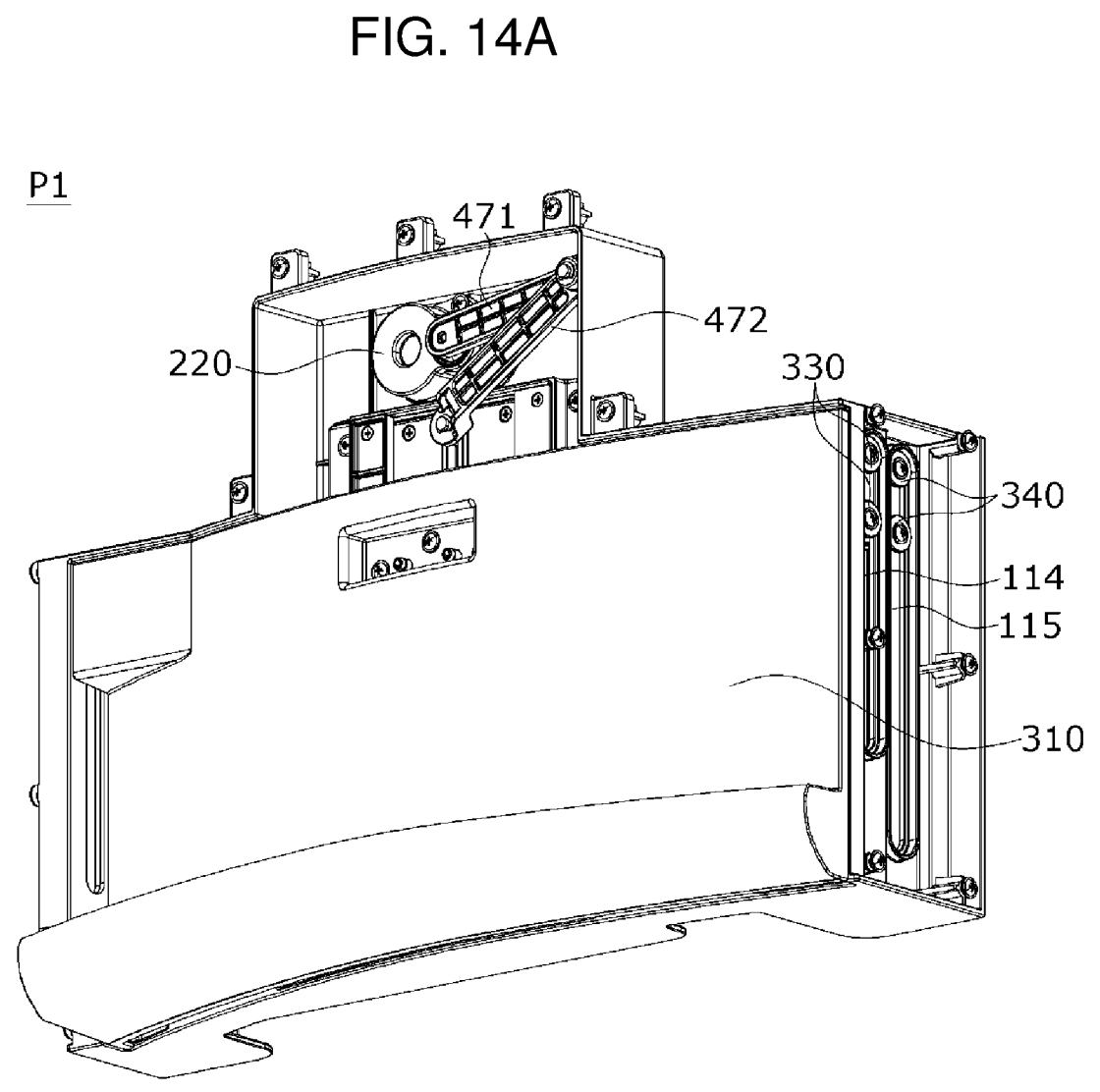
Figure 14B:
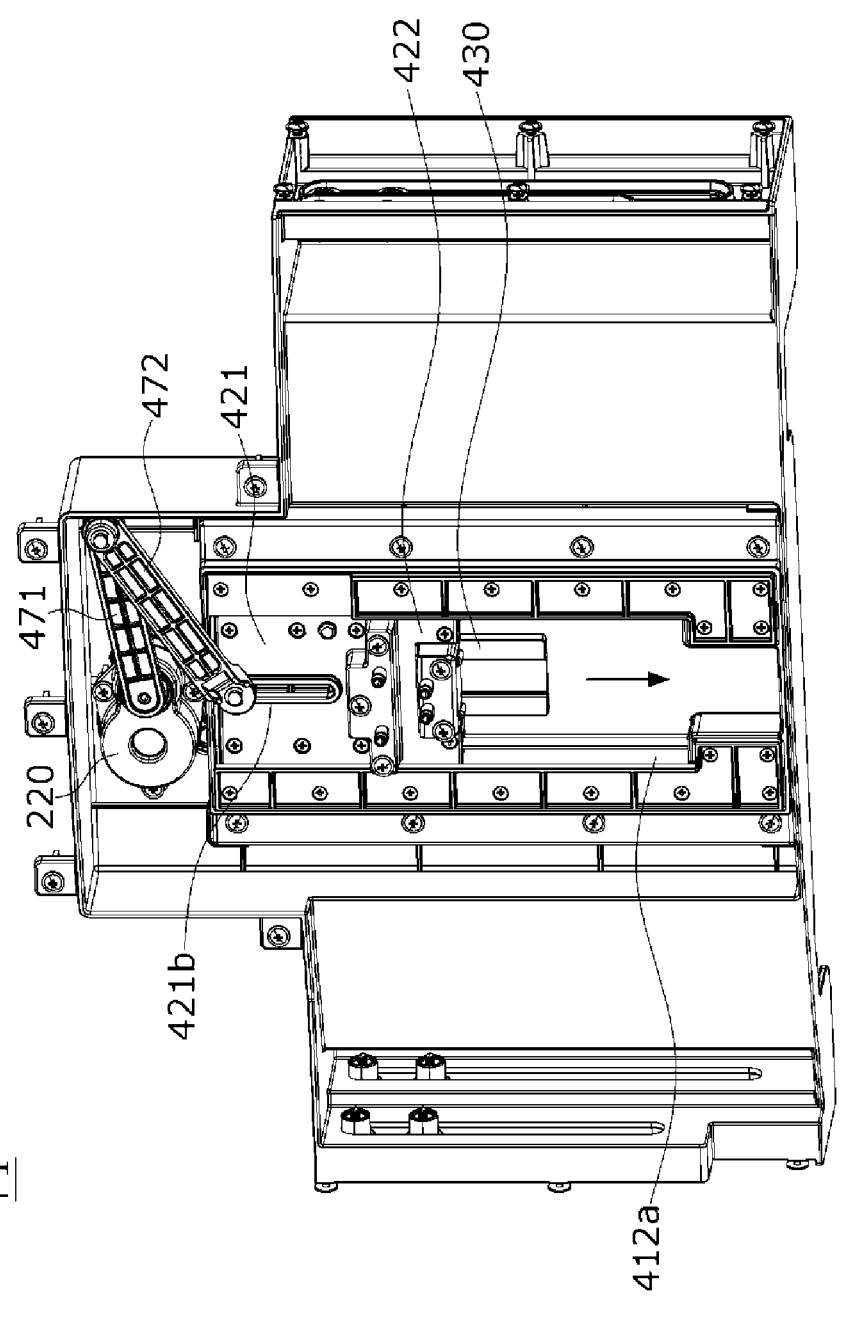
Figure 14C:
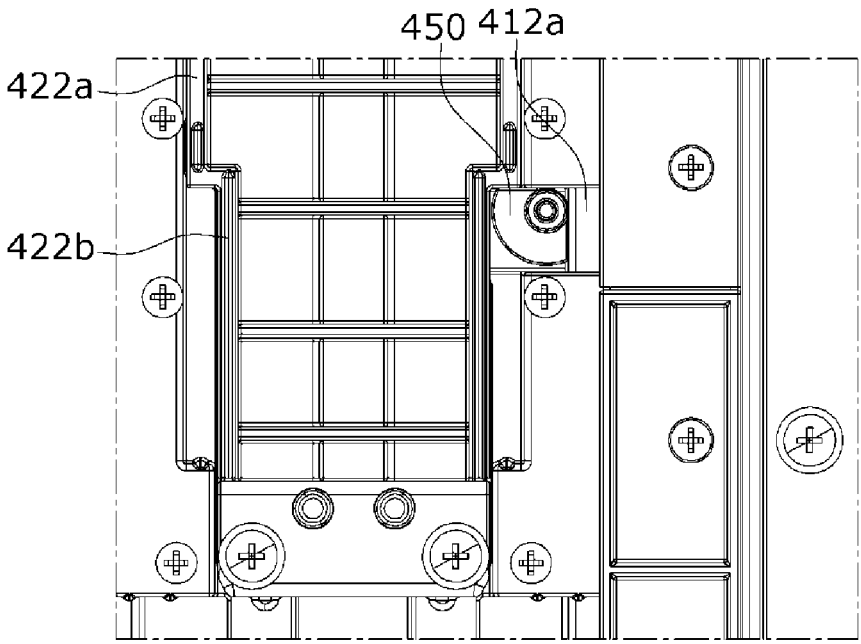

As illustrated in FIG. 12, the fourth accommodation groove 435 may be formed in the third rib 433. As illustrated in FIG. 14C which will be described below, the fourth accommodation groove 435 may accommodate the rotary pin 440 and the stopper 450. In addition, the fourth accommodation groove 435 may be connected to the arrangement groove 413 of the first guide plate 410 when the second guide plate 430 moves downward. When the fourth accommodation groove 435 and the arrangement groove 413 are connected, the stopper 450 may be rotated and disposed in the arrangement groove 413.

The rotary pin 440 may be rotatably coupled to the second guide plate 430. The rotary pin 440 may have a cylindrical shape. The rotary pin 440 may support the stopper 450 to rotate. The stopper 450 may be coupled to the rotary pin 440. The stopper 450 may rotate around the rotary pin 440. The stopper 450 may have a fan shape.

Before the second guide plate 430 comes into contact with the second rib 412*b* of the first guide plate 410, a state in which the stopper 450 is in contact with the second moving plate 422 may be maintained. More specifically, as illustrated in FIG. 14C which will be described below, in a state in which the second guide plate 430 is disposed on the first guide plate 410, the stopper 450 may be disposed to pass through a part of a space formed by the third rib 433. That is, since the stopper 450 blocks a movement passage of the second moving plate 422, the third plate body 422*a* of the second moving plate 422 may be in contact with the stopper 450 to maintain a state in which movement in the height direction is stopped. In this case, as illustrated in FIG. 14C which will be described below, a state in which the rotation of the stopper 450 is stopped by the third rib 433 forming the fourth accommodation groove 435 may be maintained.

In addition, after the second guide plate 430 comes into contact with the second rib 412*b* of the first guide plate 410, the stopper 450 may be pressed and rotated by the second moving plate 422 which moves in conjunction with the second link 472 which will be described below. More specifically, as illustrated in FIG. 16D which will be described below, when the arrangement groove 413 and the fourth accommodation groove 435 are connected, the stopper 450 may be pressed and rotated by the third plate body 422*a* of the second moving plate 422 which moves along the link unit. In this case, the rotated stopper 450 may be disposed in the arrangement groove 413. That is, the stopper 450 pressed by the third plate body 422*a* of the second moving plate 422 may open a space formed by the third rib 433.

As described above, the stopper 450 may adjust movement of the second moving plate 422 so that a second stopper 450 is deployed after a first stopper 450 is ultimately deployed. Accordingly, a situation in which the second stopper 450 is arbitrarily deployed can be prevented.

Figure 13:
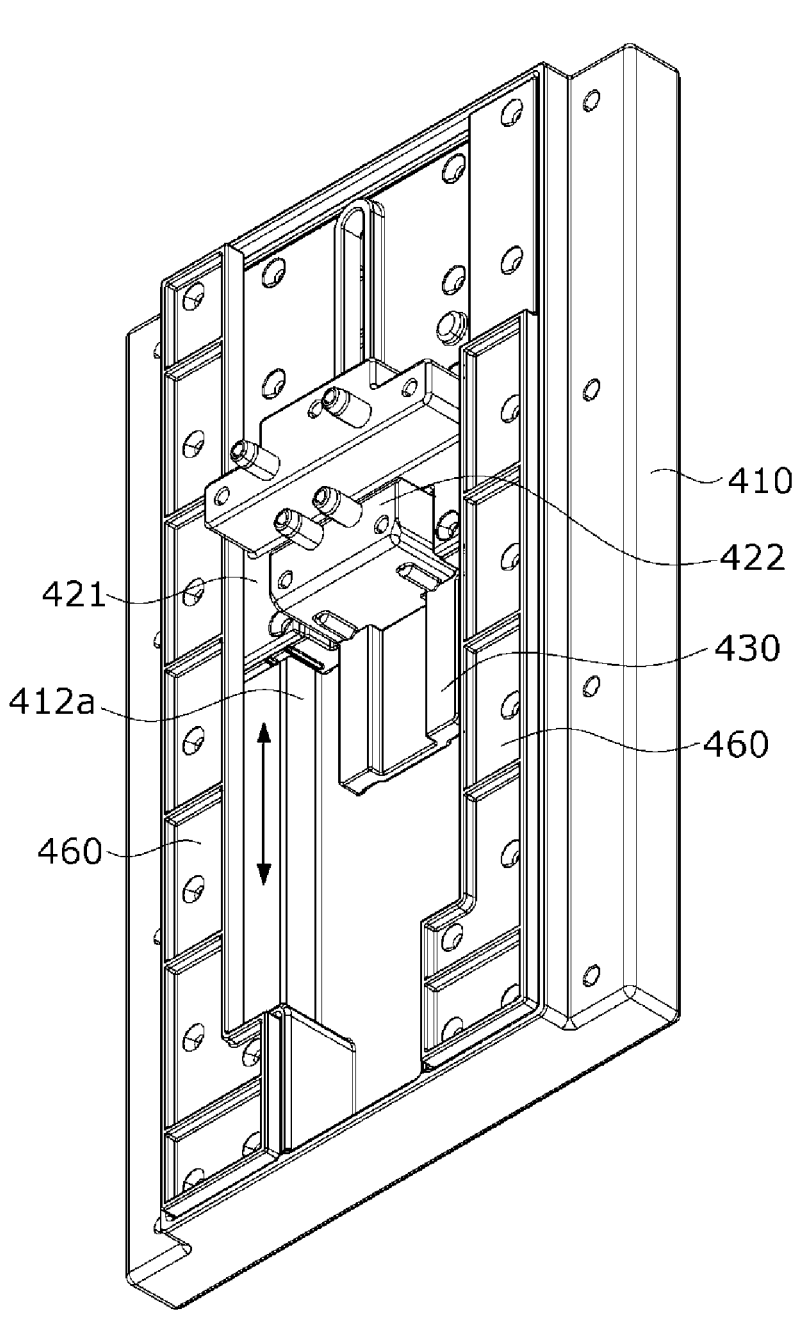
FIG. 13 is a view illustrating the first guide plate and the second moving plate which are disposed between the first guide plate and a guide cover.

FIG. 13 is a view illustrating the first guide plate and the second moving plate which are disposed between the first guide plate and the guide cover.

Referring to FIGS. 8A, 8B, and 13, the guide cover 460 may be coupled to the first guide plate 410. The guide cover 460 may be provided as a plurality of guide covers 460 disposed to be spaced apart from each other in the longitudinal direction. As illustrated in FIG. 13, the guide cover 460 and the first guide plate 410 may prevent separation of the first moving plate 421, the second moving plate 422, and the second guide plate 430. In addition, as illustrated in FIG. 13, the guide cover 460 and the first plate body 411 of the first guide plate 410 may form a moving space in which the first moving plate 421 and the second guide plate 430 are movable.

Referring to FIGS. 3 and 8A, the link assembly 470 may connect the housing unit 100 and the moving plate 420 and move the moving plate 420. The link assembly 470 may include the first link 471 and the second link 472.

The first link 471 may be connected to the actuator 200. More specifically, as illustrated in FIG. 14B which will be described below, the first link 471 may be connected to the gear part 220 of the actuator 200. The first link 471 may be rotated in conjunction with the gear part 220 when the gear part 220 is operated by power generated by the power generation part 210 of the actuator 200.

The second link 472 may be connected to the first link 471 and the second moving plate 422 and may move the second moving plate 422 in conjunction with movement of the first link 471. More specifically, the second link 472 may pass through the third guide hole 421*b* of the first moving plate 421 and may be connected to the second moving plate 422 using a connecting member such as a pin. Accordingly, the second link 472 may be rotated by the first link 471 and simultaneously linearly moved along the third guide hole 421*b*. When the second link 472 is linearly moved, the third plate body 422*a* of the second moving plate 422 connected to the second link 472 may be moved in the height direction.

The control unit 500 (e.g., one or more processors or controllers) may be connected to the actuator 200 through a communication apparatus (e.g., a transceiver) using Wi-Fi or the like. The control unit 500 may be connected to the actuator 200 by wire. The control unit 500 may transmit a control signal for generating power to the actuator 200 receiving power from an external source apparatus. In this case, the gear part 220 may be operated by the power generation part 210 of the actuator 200 receiving the control signal to rotate the first link 471 in one direction or the other direction opposite to the one direction.

The control unit 500 may detect a travel speed of the vehicle and transmit a control signal to the actuator 200 so that the first skirt 310 and the second skirt 320 are sequentially deployed or retracted based on the detected travel speed.

For example, when it is determined that a travel speed of the vehicle is greater than a first travel speed, the control unit 500 may transmit a signal for operating the actuator 200 to the power generation part 210 of the actuator 200 to move the first skirt 310 and the second skirt 320.

In addition, when it is determined that a travel speed of the vehicle is greater than a second travel speed, the control unit 500 may transmit a signal for continuously operating the actuator 200 to the power generation part 210 of the actuator 200 so that the second skirt 320 is deployed downward from the first skirt 310. In this case, the second travel speed may be greater than the first travel speed.

On the contrary, when it is determined that a travel speed of the vehicle is between the first travel speed and the second travel speed, the control unit 500 may transmit a signal for operating the actuator 200 to the power generation part 210 of the actuator 200 to retract a part of the second skirt 320 into the housing unit 100.

In addition, when it is determined that a travel speed of the vehicle is smaller than the first travel speed, the control unit 500 may transmit a signal for operating the actuator 200 to the power generation part 210 of the actuator 200 to retract the first skirt 310 and the second skirt 320 into the housing unit 100. In this case, the control unit 500 may transmit a signal for operating the actuator 200 to the power generation part 210 of the actuator 200 so that the second blocking part 312 of the first skirt 310 reaches a position at which the second blocking part 312 of the first skirt 310 is disposed in a space formed by the main portion 121 and the side portion 122 of the second housing 120.

As described above, each component of the vehicle air skirt apparatus 1 may be disposed at a first position P1, a second position P2, and a third position P3.

First, a state in which the second blocking part 312 of the first skirt 310 disposed at the first position P1 protrudes to the outside of the second housing 120 is maintained, and a state in which the first blocking part 311 of the first skirt 310 and the second skirt 320 are disposed in the housing unit 100 is maintained.

In addition, a state in which the first skirt 310 and the second skirt 320 disposed at the second position P2 pass through the outlet hole 100a so that a part thereof protrudes downward from the housing unit 100 is maintained. More specifically, a state in which parts of the first blocking part 311 and the second blocking part 312 of the first skirt 310 and a part of the third blocking part 321 of the second skirt 320 protrude downward from the housing unit 100 is maintained. In this case, the first skirt 310 is in a state in which the first skirt 310 is completely deployed and is no longer moved to the lower side of the housing unit 100. In this case, the first skirt 310 disposed at the second position P2 may protrude 90 mm from the outlet hole 100a but is not limited thereto.

In addition, a state in which the second skirt 320 disposed at the third position P3 protrudes downward from the second blocking part 312 of the first skirt 310 is maintained. In this case, the second skirt 320 disposed at the third position P3 may protrude 40 mm from the second blocking part 312 of the first skirt 310 but is not limited thereto.

Hereinafter, an operation process of the vehicle air skirt apparatus 1 will be described.

Figure 15A:
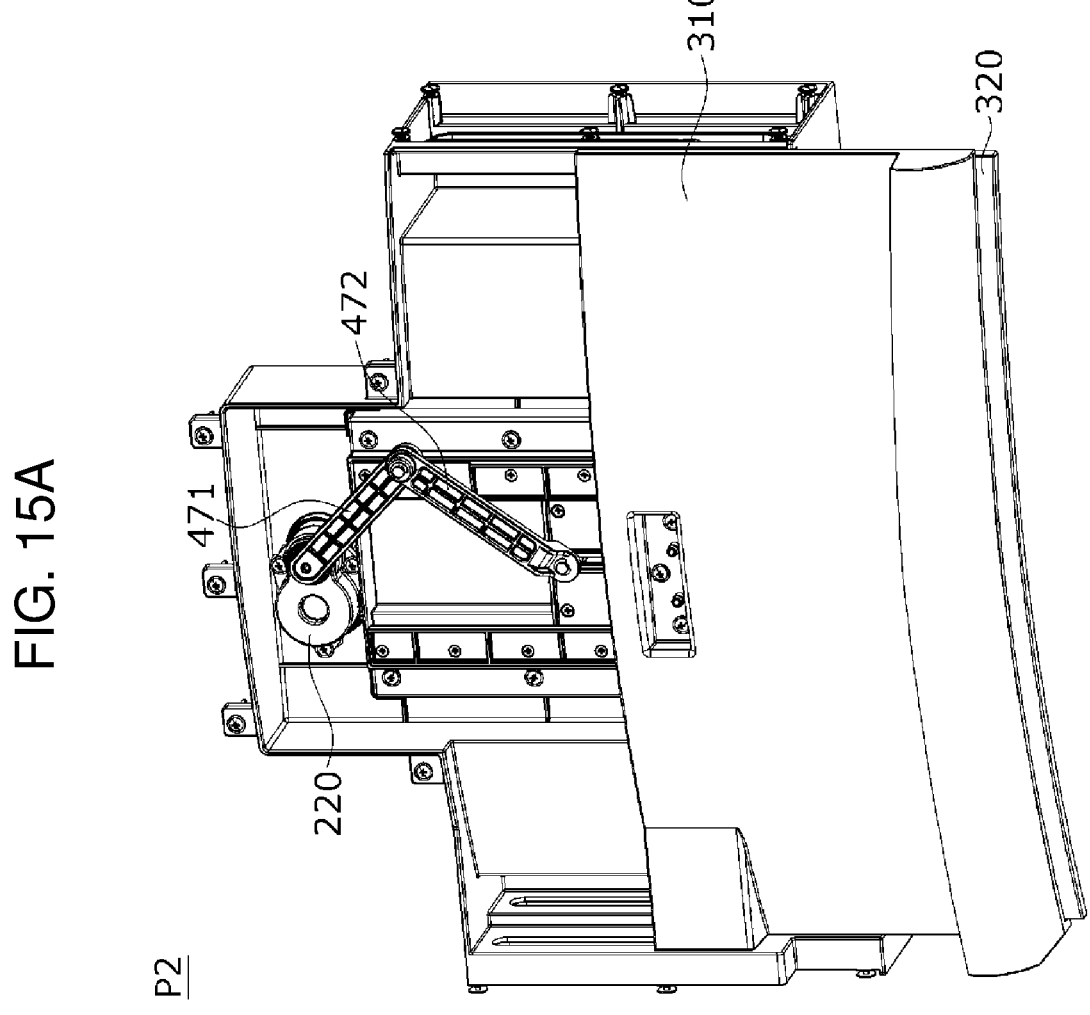
FIGS. 15A to 15C are views illustrating the first skirt and the second skirt which are disposed at a second position.
Figure 15B:
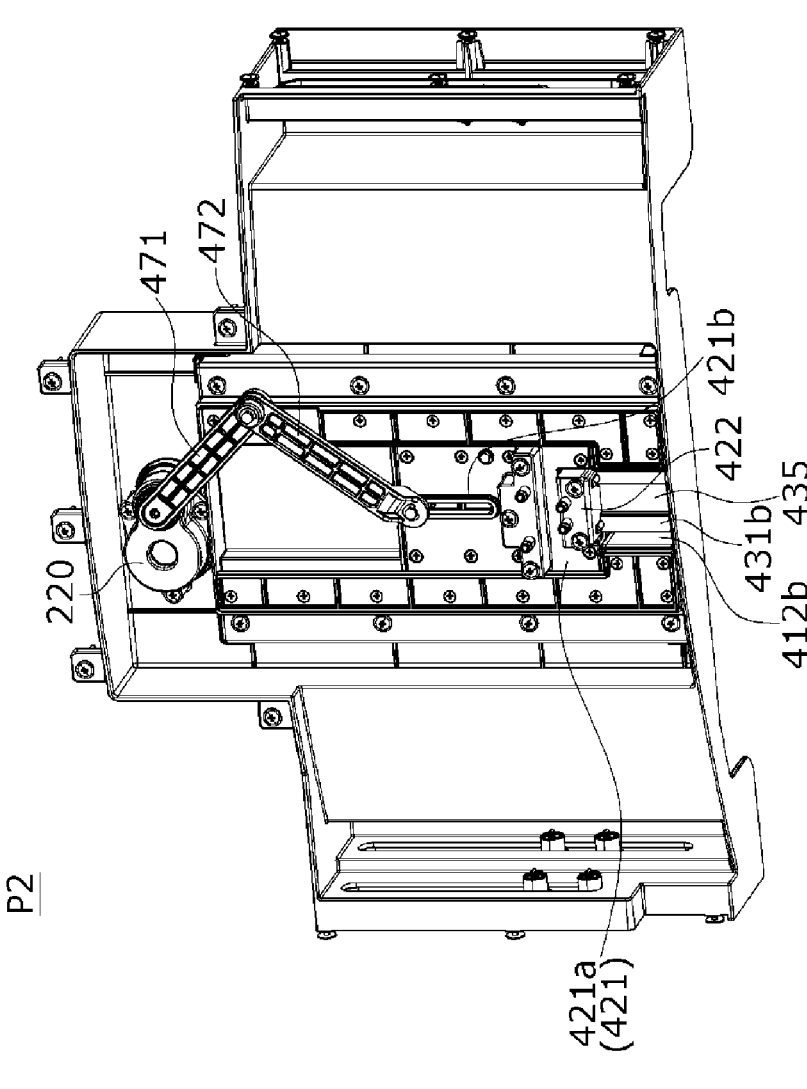
Figure 15C:
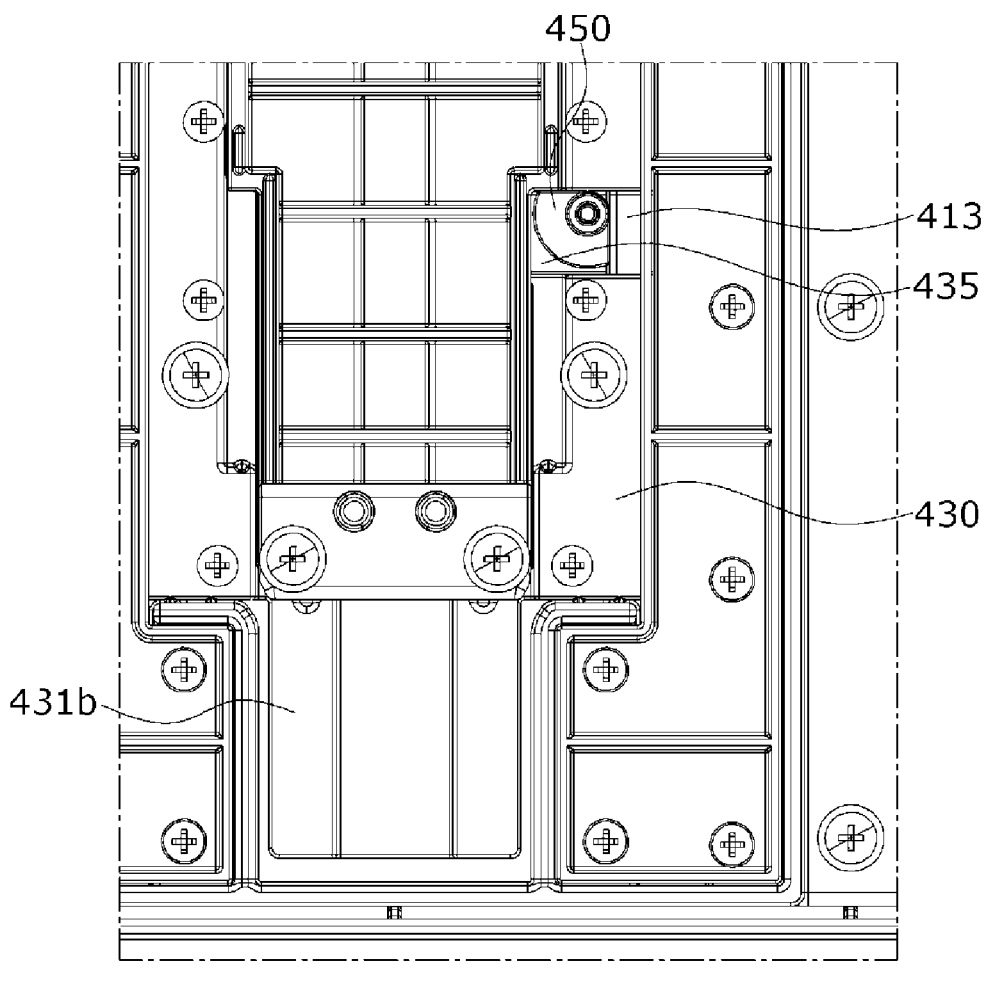

FIGS. 14A to 14C are views illustrating the first skirt and the second skirt which are disposed at the first position, FIGS. 15A to 15C are views illustrating the first skirt and the second skirt which are disposed at the second position, and FIGS. 16A to 16D are views illustrating the second skirt disposed at the third position.

Referring to FIGS. 1 to 14C, more specifically, in FIGS. 14A to 14C, in a state in which a travel speed of the vehicle is smaller than the first travel speed, a state in which the components of the vehicle air skirt apparatus 1 are disposed at the first position P1 is maintained. In this state, when it is determined that a travel speed of the vehicle is greater than the first travel speed, the control unit 500 may transmit a signal for operating the actuator 200 to the power generation part 210 of the actuator 200 to simultaneously move the first skirt 310 and the second skirt 320. When the power generation part 210 of the actuator 200 receiving the control signal generates power, the gear part 220 operates, and the first link 471 of the link unit connected to the gear part 220 rotates. In this case, the first link 471 rotates clockwise based on FIG. 14B.

When the first link 471 rotates clockwise, the second link 472 connected to the first link 471 rotates with the first link 471 and simultaneously linearly moves along a connecting member in a direction in which the third guide hole 421b of the first moving plate 421 is disposed. When the second link 472 linearly moves in the height direction, the second moving plate 422 connected to the second link 472 through the connecting member is moved in the height direction by a force generated due to the straight movement of the second link 472.

In this case, as illustrated in FIG. 14C, the third plate body 422a of the second moving plate 422 is in a state in which movement of the third plate body 422a is blocked by the stopper 450, and the stopper 450 is in a state in which rotation of the stopper 450 is blocked by the first rib 412a of the first guide plate 410. Accordingly, when the second link 472 linearly moves in the height direction, the stopper 450, the second guide plate 430, and the first moving plate 421 linearly move with the second moving plate 422.

Accordingly, the first skirt 310 coupled to the first moving plate 421 and the second skirt 320 connected to the second moving plate 422 move in the height direction, pass through the outlet hole 100a, and move downward from the housing. In this case, the first skirt 310 is linearly moved by the first guide pin 330 disposed in the first guide hole 114, and the second skirt 320 is linearly moved by the second guide pin 340 disposed in the second guide hole 115.

Referring to FIGS. 15A to 15C, in this case, since the actuator 200 continuously generates power in a state in which the actuator 200 receives the control signal from the control unit 500, the first skirt 310 and the second skirt 320 ultimately continuously move in the height direction. While this state continues, when the second plate body 421a of the first moving plate 421 and the extending portion 431b of the second guide plate 430 come into contact with the second rib 412b of the first guide plate 410, movement of the first moving plate 421, the second moving plate 422, and the second guide plate 430 is stopped. Accordingly, the first skirt 310 and the second skirt 320 are disposed at the second position P2.

In the first skirt 310 disposed at the second position P2, movement of the first moving plate 421 fixedly coupled to the second guide plate 430 is stopped by the second guide plate 430, and thus the first moving plate 421 is no longer moved. Accordingly, a state in which the first skirt 310 passes through the outlet hole 100a and protrudes downward from the bumper of the vehicle is maintained. In addition, as illustrated in FIG. 15C, the fourth accommodation groove 435 of the second guide plate 430 is disposed at a position at which the fourth accommodation groove 435 is connected to the arrangement groove 413 of the first guide plate 410.

In this state, the control unit 500 which determines that the travel speed of the vehicle is greater than the first travel speed may transmit a signal for operating the actuator 200 to the power generation part 210 of the actuator 200 to move the second skirt 320. That is, the actuator 200 operates continuously.

In this state, since the actuator 200 continuously generates the power in the state in which the actuator 200 receives the control signal from the control unit 500, the second link 472 continuously moves with the connecting member in a direction in which the third guide hole 421b of the first moving plate 421 is disposed. In this case, since a state in which the second guide plate 430 is stopped is maintained, the second moving plate 422 to be slid on the second guide plate 430 is moved downward from the second guide plate 430 in the height direction by the second link 472.

Referring to FIGS. 16A to 16D, in this state, when the second moving plate 422 starts to move downward from the second guide plate 430 in the height direction, the stopper 450 continuously pressed by the third plate body 422a of the second moving plate 422 rotates around the rotary pin 440. In this case, as sequentially illustrated in FIGS. 15C and 16D, the stopper 450 rotates counterclockwise. Accordingly, the rotary pin 440 is disposed in the arrangement groove 413 of the first guide plate 410, and a passage through which the second moving plate 422 moves is secured. In addition, the third plate body 422a moves until the third plate body 422a comes into contact with the fourth rib 434 of the second guide plate 430 in the height direction.

When the second moving plate 422 continuously moves and the third plate body 422a comes into contact with the fourth rib 434 of the second guide plate 430, movement of the second moving plate 422 is stopped. Accordingly, movement of the second skirt 320 coupled to the fourth protruding portion 422c of the second moving plate 422 is stopped. In this case, as illustrated in FIG. 16A, a part of the second skirt 320 protrudes downward from the first skirt 310. As described above, since the second skirt 320 is disposed at the third position P3, the vehicle air skirt apparatus 1 may block a headwind and prevent foreign matter from being collided with internal components of the vehicle.

As described above, since the vehicle air skirt apparatus 1 according to one embodiment of the present invention is structured so that the first skirt 310 having high rigidity and the second skirt 320 having flexibility are sequentially deployed, a phenomenon in which the first skirt 310 having high rigidity is damaged due to collision with foreign matter, an obstacle, and a speed bump on the road surface can be prevented.

In addition, the first skirt 310 and the second skirt 320 can be sequentially deployed according to a travel speed of the vehicle. Accordingly, when compared to the structure in which the conventional air skirt apparatus having one skirt depends on a rotation speed of the actuator 200, since the vehicle air skirt apparatus 1 according to one embodiment of the present invention can prevent an over operation of the actuator 200, a lifetime of the actuator 200 can increase, and a cost of repairing or reinstalling the actuator 200 can be reduced.

According to one embodiment of the present invention, since a structure in which a flexible skirt protrudes downward from a rigid skirt is provided, damage to the skirt can be prevented.

In addition, according to one embodiment of the present invention, since a structure in which two skirts are sequentially deployed according to a travel speed is provided, an over operation of an actuator is prevented, and thus a failure probability of the actuator can be reduced.

While the present invention has been described above with reference to exemplary embodiments, it may be understood by those skilled in the art that various modifications and changes of the present invention may be made within a range not departing from the spirit and scope of the present invention defined by the appended claims. In addition, it should be interpreted that differences related to the modifications and changes fall within the scope of the present invention defined by the appended claims.

What is claimed is:

1. A vehicle air skirt apparatus comprising:
a housing having an outlet hole;
a skirt including a first skirt and a second skirt which are movably disposed in the housing to protrude outward from the housing through the outlet hole; and
a guide which is disposed in the housing,
wherein the guide is configured to guide the first skirt and the second skirt such that, when any one of the first skirt and the second skirt is completely withdrawn into the housing, the other one of the first skirt and the second skirt is additionally withdrawn into the housing, and
wherein the guide includes:
a first guide plate which is fixedly installed in the housing and on which first guide ribs are formed;
a moving plate which is movably disposed between the first guide ribs and moves the first skirt and the second skirt; and
a link assembly which connects the housing and the moving plate and moves the moving plate.

2. The vehicle air skirt apparatus of claim 1, wherein the moving plate includes:
a first moving plate connected to the first skirt to move the first skirt; and
a second moving plate connected to the second skirt to move the second skirt.

3. The vehicle air skirt apparatus of claim 2, wherein the first guide rib of the first guide plate includes:
a first rib which forms a moving space of the moving plate and guides a moving direction of the moving plate; and
a second rib which forms a step with the first rib and stops movement of the first moving plate.

4. The vehicle air skirt apparatus of claim 3, wherein the guide includes a second guide plate which is disposed between the first guide plate and the first moving plate and guides a moving direction of the second moving plate.

5. The vehicle air skirt apparatus of claim 4, wherein the second guide plate includes:
a third rib which forms a moving space of the second moving plate and guides a moving direction of the moving plate; and
a fourth rib which forms a step with the third rib and stops movement of the second moving plate.

6. The vehicle air skirt apparatus of claim 5, further comprising:

an actuator fixed to the housing, wherein the link assembly includes:

a first link connected to the actuator; and a second link which is connected to the first link and the second moving plate and moves the second moving plate in conjunction with movement of the first link.

7. The vehicle air skirt apparatus of claim 6, wherein the first moving plate includes a guide hole which is disposed in a direction in which the second moving plate moves and guides a moving direction of the second link.

8. The vehicle air skirt apparatus of claim 6, wherein guide includes:

a rotary pin rotatably coupled to the second guide plate; and a stopper coupled to the rotary pin and rotated around the rotary pin, wherein, in a state before the second guide plate comes into contact with the second rib of the first guide plate, the stopper maintains a state in which contact with the second moving plate.

9. The vehicle air skirt apparatus of claim 8, wherein, after the second guide plate comes into contact with the second rib of the first guide plate, the stopper is pressed and rotated by the second moving plate which moves in conjunction with the second link.

10. An air skirt system for a vehicle, the system comprising:

a housing having an outlet hole;

a skirt including a first skirt and a second skirt which are movably disposed in the housing to protrude outward from the housing through the outlet hole;

a guide which is disposed in the housing, the guide including an actuator to move the first skirt and the second skirt;

a controller configured to control the guide to actuate the actuator to guide the first skirt and the second skirt such that, when any one of the first skirt and the second skirt is completely withdrawn into the housing, the other one of the first skirt and the second skirt is additionally withdrawn into the housing; and a transceiver, wherein the controller is in communication with the guide via the transceiver.

11. The system of claim 10, wherein the first skirt is positioned adjacent the second skirt.

12. The system of claim 11, wherein the first skirt comprises a rigid material, and wherein the second skirt comprises a flexible material.

13. The system of claim 11, further comprising:

one or more sensors configured to detect whether the first skirt or the second skirt is completely withdrawn into the housing.

* * * * *